United States Patent
Whelan et al.

(10) Patent No.: US 9,213,103 B2
(45) Date of Patent: Dec. 15, 2015

(54) CELLS OBTAINING TIMING AND POSITIONING BY USING SATELLITE SYSTEMS WITH HIGH POWER SIGNALS FOR IMPROVED BUILDING PENETRATION

(75) Inventors: David A. Whelan, Newport Coast, CA (US); Gregory M. Gutt, Ashburn, VA (US)

(73) Assignee: THE BOEING COMPANY, Chicago, IL (US)

( * ) Notice: Subject to any disclaimer, the term of this patent is extended or adjusted under 35 U.S.C. 154(b) by 612 days.

(21) Appl. No.: 13/442,603

(22) Filed: Apr. 9, 2012

(65) Prior Publication Data
US 2013/0203437 A1   Aug. 8, 2013

Related U.S. Application Data

(60) Continuation-in-part of application No. 12/833,795, filed on Jul. 9, 2010, now Pat. No. 8,179,312, which is a division of application No. 12/130,893, filed on May 30, 2008, now Pat. No. 8,035,558.

(51) Int. Cl.
| | |
|---|---|
| *G01S 19/05* | (2010.01) |
| *G01S 19/39* | (2010.01) |
| *G01S 19/23* | (2010.01) |
| *G01S 19/21* | (2010.01) |
| *G01S 19/25* | (2010.01) |

(52) U.S. Cl.
CPC ............... *G01S 19/23* (2013.01); *G01S 19/05* (2013.01); *G01S 19/21* (2013.01); *G01S 19/256* (2013.01)

(58) Field of Classification Search
USPC ............ 342/357.22, 357.39, 357.42, 357.64, 342/357.77; 455/12.1, 456.1; 701/468
See application file for complete search history.

(56) References Cited

U.S. PATENT DOCUMENTS

| | | | |
|---|---|---|---|
| 4,701,934 | A | 10/1987 | Jasper |
| 6,178,195 | B1 | 1/2001 | Durboraw, III et al. |
| 7,042,392 | B2 | 5/2006 | Whelan et al. |
| 7,372,400 | B2 | 5/2008 | Cohen et al. |
| 7,468,696 | B2 | 12/2008 | Bornholdt |
| 7,489,926 | B2 | 2/2009 | Whelan et al. |
| 7,554,481 | B2 | 6/2009 | Cohen et al. |

(Continued)

FOREIGN PATENT DOCUMENTS

CN   1688894 A   10/2005

OTHER PUBLICATIONS

European Search Report, Patent Application No. EP 13190543.2-1812 /2720067, Mar. 19, 2014.

(Continued)

*Primary Examiner* — Dao Phan
(74) *Attorney, Agent, or Firm* — Vista IP Law Group LLP; Cynthia A. Dixon

(57) ABSTRACT

A system, method, and apparatus for cells to obtain timing and positioning by using satellite systems with high power signals for improved building penetration are disclosed herein. In particular, the present disclosure relates to providing timing synchronization and geolocation for small cells or macrocells in attenuated and/or indoor environments. In order to achieve timing synchronization and geolocation, the cells utilize high power signals, which contain timing information, in conjunction with related aiding information. Satellites, such as Low Earth Orbiting (LEO) Iridium satellites, are employed to transmit the high powered signals to the cells.

22 Claims, 12 Drawing Sheets

(56) References Cited

U.S. PATENT DOCUMENTS

| | | |
|---|---|---|
| 7,579,986 B2 | 8/2009 | DiEsposti |
| 7,579,987 B2 | 8/2009 | Cohen et al. |
| 7,583,225 B2 | 9/2009 | Cohen et al. |
| 7,619,559 B2 | 11/2009 | DiEsposti |
| 7,688,261 B2 | 3/2010 | DiEsposti |
| 2002/0082024 A1 | 6/2002 | Bajikar |
| 2004/0042576 A1 | 3/2004 | Anderson |
| 2005/0159891 A1 | 7/2005 | Cohen et al. |
| 2007/0236387 A1 | 10/2007 | Monnerat |
| 2008/0059059 A1 | 3/2008 | Cohen et al. |
| 2008/0143605 A1 | 6/2008 | Bornholdt |
| 2008/0146246 A1 | 6/2008 | Bornholdt |
| 2009/0174597 A1 | 7/2009 | DiLellio et al. |
| 2009/0228210 A1 | 9/2009 | Gutt |
| 2009/0315764 A1 | 12/2009 | Cohen et al. |
| 2009/0315769 A1 | 12/2009 | Whelan et al. |
| 2010/0171652 A1 | 7/2010 | Gutt et al. |

OTHER PUBLICATIONS

Zantou, E.B., et al., "Orbit Calculation and Doppler Correction Algorithm in a LEO Satellite Small Ground Terminal", 19th Annual AIAA USU Conference on Small Satellites, Aug. 31, 2005, XP002721350, Retrieved from the Internet at http://digitalcommons.usu.edu/cgi/viewcontent.cgi?article=1659&content=smallsat, retrieved on Mar. 7, 2014, p. 1-p. 8, figures 1-3.

Fossa, C.E., et al., "An Overview of the Iridium (R) Low Earth Orbit (LEO) Satellite System", Aerospace and Electronics Conference, 1998. NAECON 1998. Proceedings of the IEEE National Dayton, OH, USA, Jul. 13-17, 1998, New York, New York, USA, IEEE, US Jul. 13, 1998, pp. 152-159, XP010298906, ISBN: 978-0-7803-4449-5, the whole document.

Office Action from Chinese Patent Office for corresponding Chinese Patent Application No. 200980119981.9, issued on Jul. 6, 2015.

Research on Pseudorandom Code Acquisition in Dynamic GPS Receivers, Li Ji-zhong, et al., Modem Radar, vol. 28, No. 12, Dec. 2006.

CELLS OBTAINING TIMING AND POSITIONING BY USING SATELLITE SYSTEMS WITH HIGH POWER SIGNALS FOR IMPROVED BUILDING PENETRATION

CROSS-REFERENCE TO RELATED APPLICATIONS

This application is a Continuation-In-Part application of, and claims the benefit of, U.S. patent application Ser. No. 12/833,795, filed Jul. 9, 2010, which in turn is a divisional application of, and claims the benefit of, U.S. patent application Ser. No. 12/130,893, filed May 30, 2008, and issued as U.S. Pat. No. 8,035,558 on Oct. 11, 2011. Both patent applications are hereby incorporated by reference in their entirety.

In addition, this application is related to U.S. patent application Ser. No. 12/130,880, filed on May 30, 2008, and issued as U.S. Pat. No. 7,952,518, the contents of which are hereby incorporated by reference in their entirety.

TECHNICAL FIELD

The present invention relates generally to cells and, more particularly, to cells (i.e. macrocells and/or small cells) obtaining timing and positioning by using satellite systems with high power signals for improved building penetration.

BACKGROUND

Existing navigation and timing signals provided by various existing satellite navigation systems often do not provide satisfactory system performance. In particular, the signal power, bandwidth, and geometrical leverage of such navigation and timing signals are generally insufficient to meet the needs of many demanding usage scenarios.

Existing navigation and timing approaches based, for example, on Global Positioning System (GPS) signals may not be available to a navigation user in many instances. Typically, a GPS receiver must receive at least four simultaneous ranging sources to permit three dimensional positioning and accurate time transfer. However, GPS signals often provide insufficient, low-signal power or geometry to readily penetrate urban canyons or the walls of buildings. Other navigation approaches based, for example, on cellular telephone or television signals typically lack vertical navigation information.

Existing systems have attempted to address indoor navigation deficiencies by the use of various approaches, for example, inertial navigation systems, specialized beacons, and highly sensitive GPS systems. However, inertial navigation systems drift and are expensive. Beacons require specialized fixed assets that are expensive and not standardized thus having only specialized utility, and sensitive GPS systems often do not perform to user expectations due to the weakness of the GPS signals in indoor environments.

SUMMARY

In one or more embodiments, a method is disclosed for a cell to obtain precise absolute time from a satellite. The disclosed method involves receiving, with at least one antenna associated with the cell, at least one precision time signal from at least one satellite. In one or more embodiments, at least one precision time signal comprises a correlation code. The method further involves determining, with at least one processor, a timing phase of the code. Also, the method involves receiving, by at least one processor, aiding information. In addition, the method involves determining, by at least one processor, the precise absolute time by using the timing phase and the aiding information.

In at least one embodiment, the cell is a small cell or a macrocell. In one or more embodiments, the aiding information is received by at least one processor through a network. In some embodiments, the network is provided by ground based infrastructure. In one or more embodiments, the network is a cellular network, a WiFi network, and/or an Internet network.

In one or more embodiments, the aiding information comprises orbit information associated with at least one of the satellites, an approximate location of the cell, an approximate range between at least one of the satellites and the cell, approximate time information, and/or timing bias information associated with at least one of the satellites. In some embodiments, the code alternates between a coarse timing code and a pseudorandom code.

In at least one embodiment, at least one satellite is a Low Earth Orbiting (LEO) satellite, a Medium Earth Orbiting (MEO) satellite, and/or a Geosynchronous Earth Orbiting (GEO) satellite. In some embodiments, at least one satellite is a LEO satellite, and may be an Iridium satellite or a Globalstar satellite. In other embodiments, at least one satellite is a MEO satellite, and may be a BeiDou COMPASS satellite, a Galileo satellite, or a Global Orbiting Navigation System (GLONASS) satellite.

In one or more embodiments, the disclosed method employs an Iridium LEO satellite constellation, where each of the satellites in the constellation has an antenna geometry that transmits forty-eight (48) spot beams with a distinctive spot beam pattern. In at least one embodiment, at least one precision time signal may be transmitted from at least one of the Iridium satellites in the constellation. The forty-eight (48) spot beams of an Iridium satellite may be used to transmit localized precision time signals to receiving sources (e.g., cells) located on or near the Earth's surface. The broadcasted message burst content associated with these signals includes pseudorandom noise (PRN) data. It should be noted that when employing one of the above-described Iridium LEO satellites, the transmission signal power is sufficiently strong enough to allow for the signal to penetrate into an indoor environment reliably. It should be further noted that this system could employ at least one next generation Iridium satellite, or a combination of existing Iridium satellites with next generation Iridium satellites.

In one or more embodiments, the disclosed method further involves determining the aiding information from a Doppler profile of at least one of the satellites.

In at least one embodiment, a method is disclosed for a cell to perform geolocation. The disclosed method involves receiving, with at least one antenna associated with the cell, at least one precision time signal from at least one satellite. In one or more embodiments, at least one precision time signal comprises a correlation code. The method further involves determining, with at least one processor, a timing phase of the code. Also, the method involves receiving, by at least one processor, aiding information. In addition, the method involves determining, by at least one processor, the precise absolute time by using the timing phase and the aiding information. Additionally, the method involves aligning system correlators of the cell using the precise absolute time to facilitate positioning of the cell. Also, the method involves measuring ranging code for at least one of the satellites over time. Further, the method involves combining the ranging code with the aiding information to obtain absolute geolocation of the cell.

In one or more embodiments, a system is disclosed for a cell to obtain precise absolute time from a satellite. The disclosed system involves the cell, and at least one antenna associated with the cell to receive at least one precision time signal from at least one satellite. In at least one embodiment, at least one precision time signal comprises a correlation code. The disclosed system further involves at least one processor configured to determine a timing phase of the code, to receive aiding information, and to determine the precise absolute time by using the timing phase and the aiding information.

In at least one embodiment, at least one processor is further configured to determine the aiding information from a Doppler profile of at least one of the at least one satellite.

In one or more embodiments, a system is disclosed for a cell to perform geolocation. The disclosed system involves the cell, and at least one antenna associated with the cell to receive at least one precision time signal from at least one satellite. In some embodiments, at least one precision time signal comprises a correlation code. The system further involves at least one processor configured to determine a timing phase of the code, receive aiding information, determine the precise absolute time by using the timing phase and the aiding information, align system correlators of the cell using the precise absolute time to facilitate positioning of the cell, measure ranging code for at least one of the satellites over time, and combine the ranging code with the aiding information to obtain absolute geolocation of the cell.

In one embodiment, a method of obtaining precise absolute time transfer from a satellite comprises: receiving a precision time signal from a satellite, wherein the precision time signal comprises a periodic repeating code; determining a timing phase of the code; receiving additional aiding information; and using the timing phase and the additional aiding information to determine a precise absolute time.

In another embodiment, a method of performing navigation in attenuated or jammed environments comprises: detecting a frame structure of a signal received from a first satellite; aligning a clock of a receiver unit to the detected frame structure; generating multiple time estimates respectively separated according to the frame structure, wherein at least one time estimate will be aligned to a signal of a second satellite; providing the time estimates to system correlators of the receiver unit; aligning the system correlators according to the time estimates; and identifying the at least one time estimate that is aligned to the signal source from the second satellite, wherein the at least one time estimate provides successful aiding information to the receiver unit and significantly improves detection efficiency.

In another embodiment, a receiver unit adapted for use in attenuated or jammed environments comprises: an antenna adapted to receive a precision time signal from a satellite and receive additional aiding information, wherein the precision time signal comprises a periodic repeating code; a processor; and a memory adapted to store a plurality of computer readable instructions which when executed by the processor are adapted to cause the receiver unit to: determine a timing phase of the code, and use the timing phase and the additional aiding information to determine a precise absolute time.

In another embodiment, a receiver unit adapted for use in attenuated or jammed environments comprises: an antenna adapted to receive a precision time signal from a first satellite wherein the precision time signal comprises a frequency band frame structure, and to receive a second signal from a second satellite; a processor; and a memory adapted to store a plurality of computer readable instructions which when executed by the processor are adapted to cause the receiver unit to: detect the frame structure of the first satellite; align an internal clock of the receiver unit to the frame structure of the first satellite; generate multiple time estimates respectively separated according the frame structure of the first satellite, wherein at least one time estimate is aligned to the signal from the second satellite; align system correlators of the receiver unit according to the time estimates; and identify the at least one time estimate that is aligned to the signal from the second satellite such that successful aiding information is provided to the receiver unit.

In one embodiment, a receiver unit adapted to perform geolocation comprises: an antenna adapted to receive a precision time signal from a satellite and receive additional aiding information from a wireless network station, wherein the precision time signal comprises a periodic repeating code; a processor; and a memory adapted to store a plurality of computer readable instructions which when executed by the processor are adapted to cause the receiver unit to: use the precision time signal and the aiding information to determine a precise absolute time, determine positioning information associated with the receiver unit, use the positioning information to request location information of the wireless network station, and determine an absolute geolocation of the receiver unit using the positioning information and the location information.

In another embodiment, a method for performing geolocation comprises: receiving a precision timing signal from a satellite; receiving aiding information from at least one wireless network station; using the precision timing signal and the aiding information to determine a precise absolute time; aligning system correlators of a receiver unit using the precise absolute time to determine positioning information associated with the receiver unit; using the positioning information, requesting location information of the wireless network station; receiving the location information from the wireless network station; and using the positioning information and the location information to perform absolute geolocation.

In another embodiment, a method for performing geolocation comprises: receiving a precision timing signal from a satellite; receiving aiding information from at least one wireless network station; using the precision timing signal and the aiding information to determine a precise absolute time; aligning system correlators of a receiver unit using the precise absolute time to determine positioning information associated with the receiver unit; measuring ranging code for multiple satellites over time; combining the ranging code with the aiding information; computing positioning information; surveying location information of the wireless network station using the positioning information; receiving the location information that is transmitted on a wireless network station ranging code; and combining the positioning information and the wireless network station ranging code to perform absolute geolocation.

In another embodiment, a receiver unit adapted to perform geolocation comprises: an antenna adapted to receive a precision time signal from a satellite and receive additional aiding information from at least one wireless network station, wherein the precision time signal comprises a periodic repeating code; a processor; and a memory adapted to store a plurality of computer readable instructions which when executed by the processor are adapted to cause the receiver unit to: receive the precision time signal from the satellite; receive the aiding information from the at least one wireless network station; use the precision time signal code and the aiding information to determine a precise absolute time; align system correlators of the receiver unit using the precise absolute time to determine positioning information associated with the receiver unit; measure ranging code for multiple satellites over time; combine the ranging code with the aiding information; compute positioning information; survey location information of the at least one wireless network station using the positioning information; receive the location information that is transmitted on a wireless network station ranging code; and combine the positioning information and the wireless network station ranging code to perform absolute geolocation.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

DRAWINGS

FIG. 1 provides an overview of a navigation system that is able to perform in occluded or jammed environments according to an embodiment of the present invention.

FIG. 1A shows a functional block diagram of receiver unit 302 according to an embodiment of the disclosure.

FIG. 2 provides a flow diagram illustrating a method of obtaining precise absolute time transfer from a satellite according to an embodiment of the present invention.

Figure 3B:
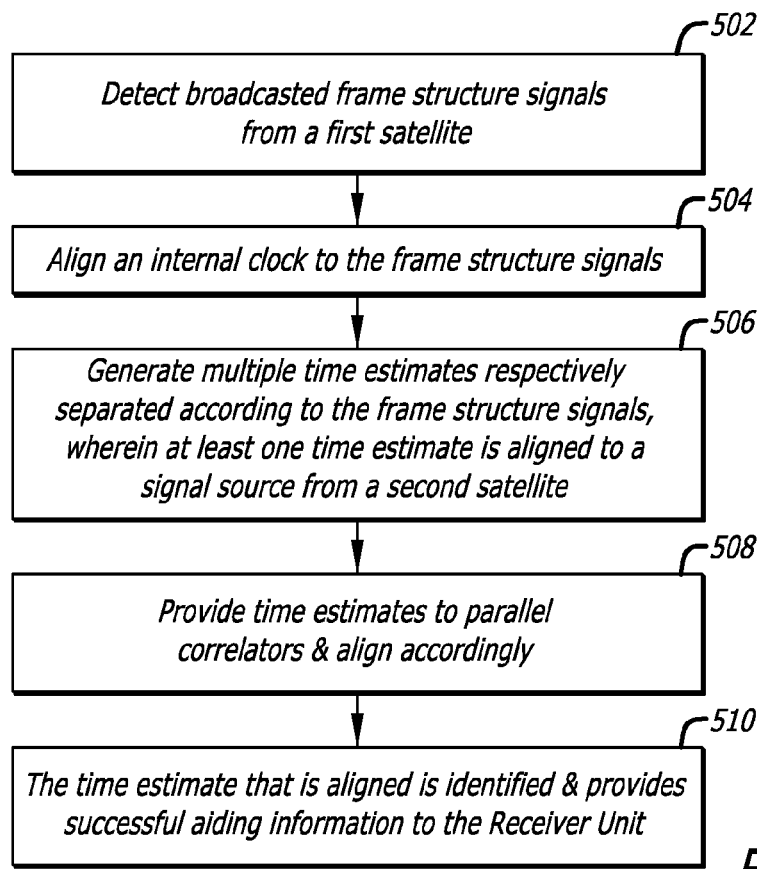
FIG. 3 illustrates a time transfer structure signal of a low earth orbit (LEO) satellite according to an embodiment of the present invention.
FIG. 3A shows a flow diagram of a method for determining the code phase of a received satellite signal according to an embodiment.

FIG. 3B provides a flow diagram illustrating a method of performing time transfer and navigation in attenuated or jammed environments according to an embodiment of the present invention.

Figure 4:
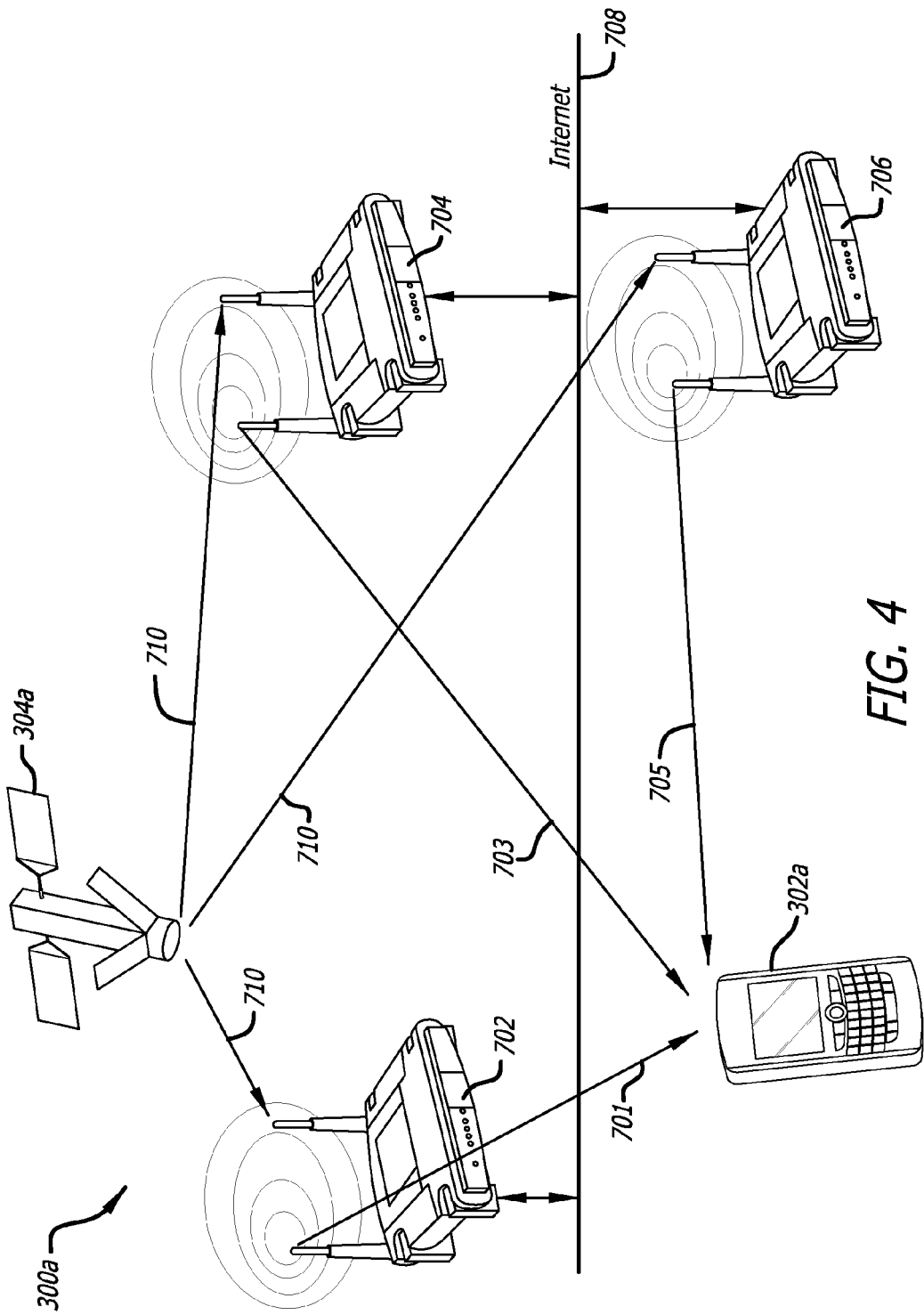

FIG. 4 provides a self forming navigation system that uses satellites to provide wireless network station localization according to an embodiment of the present invention.

Figure 5:
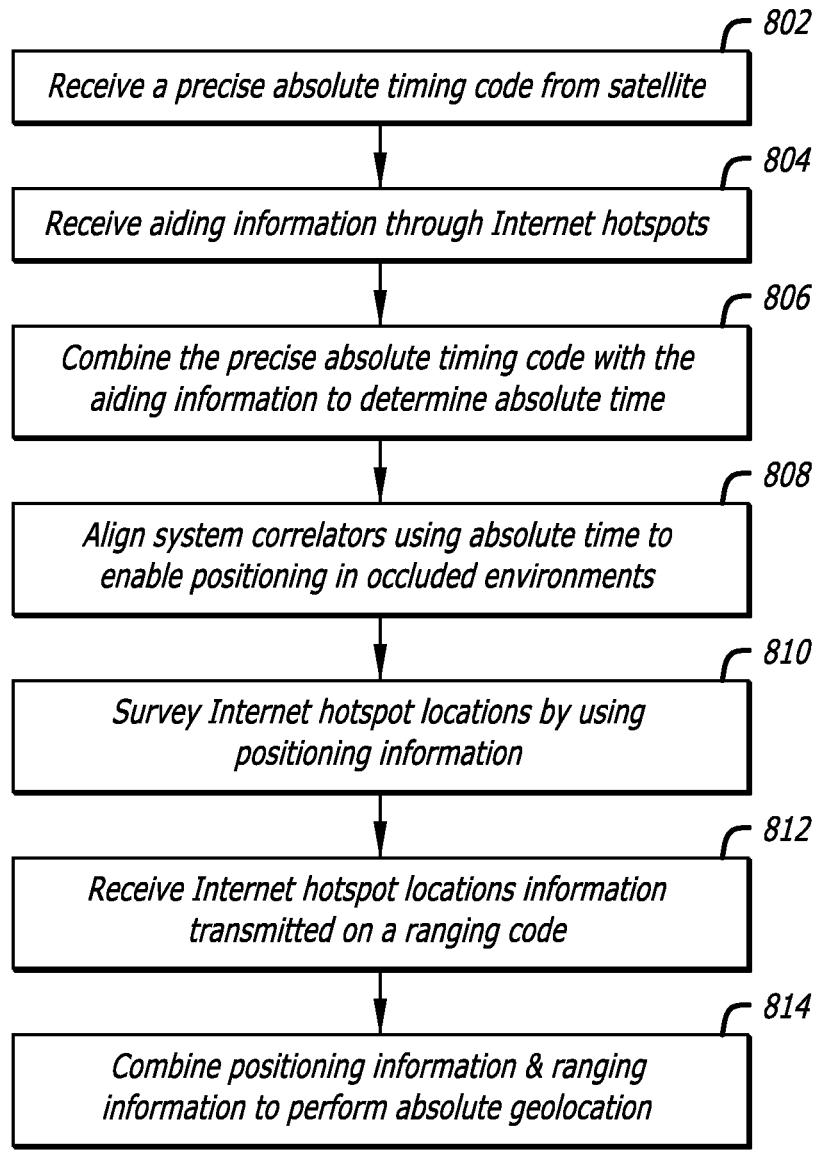

FIG. 5 provides a flow diagram illustrating a method for performing geolocation by integrating satellite signals and wireless network signals according to an embodiment of the present invention.

Figure 6:
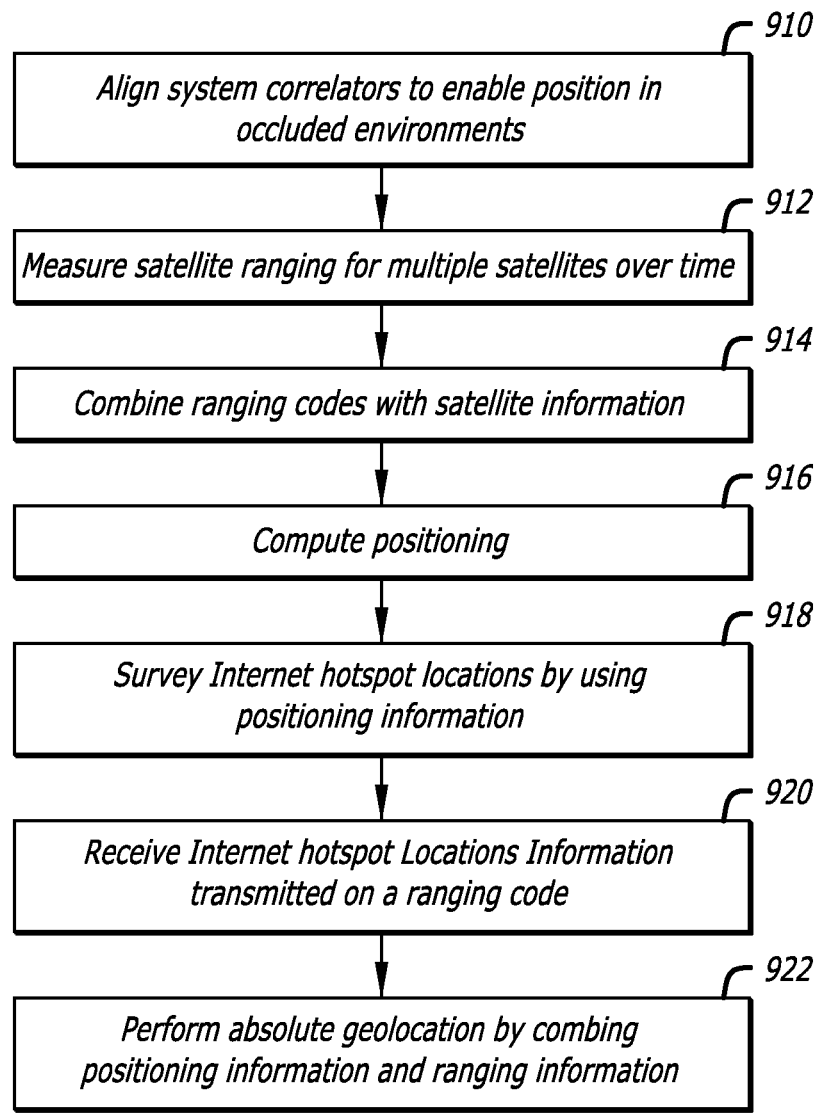

FIG. 6 provides a flow diagram illustrating a method for performing geolocation by integrating satellite signals and wireless network signals according to another embodiment of the present invention.

Figure 7:
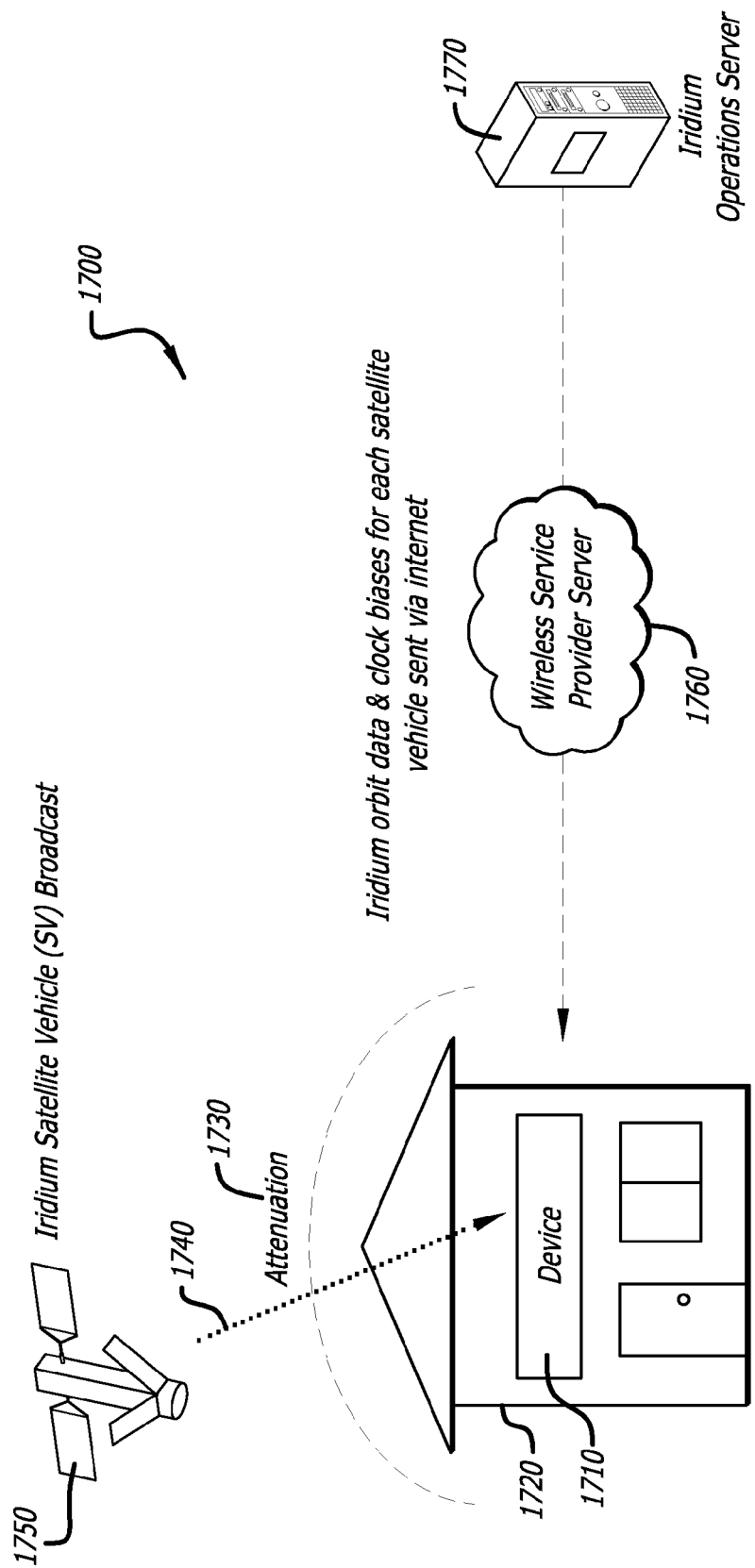

FIG. 7 provides an overview of a small cell system that is able to perform in occluded or jammed environments according to an embodiment of the present invention.

Figure 8:
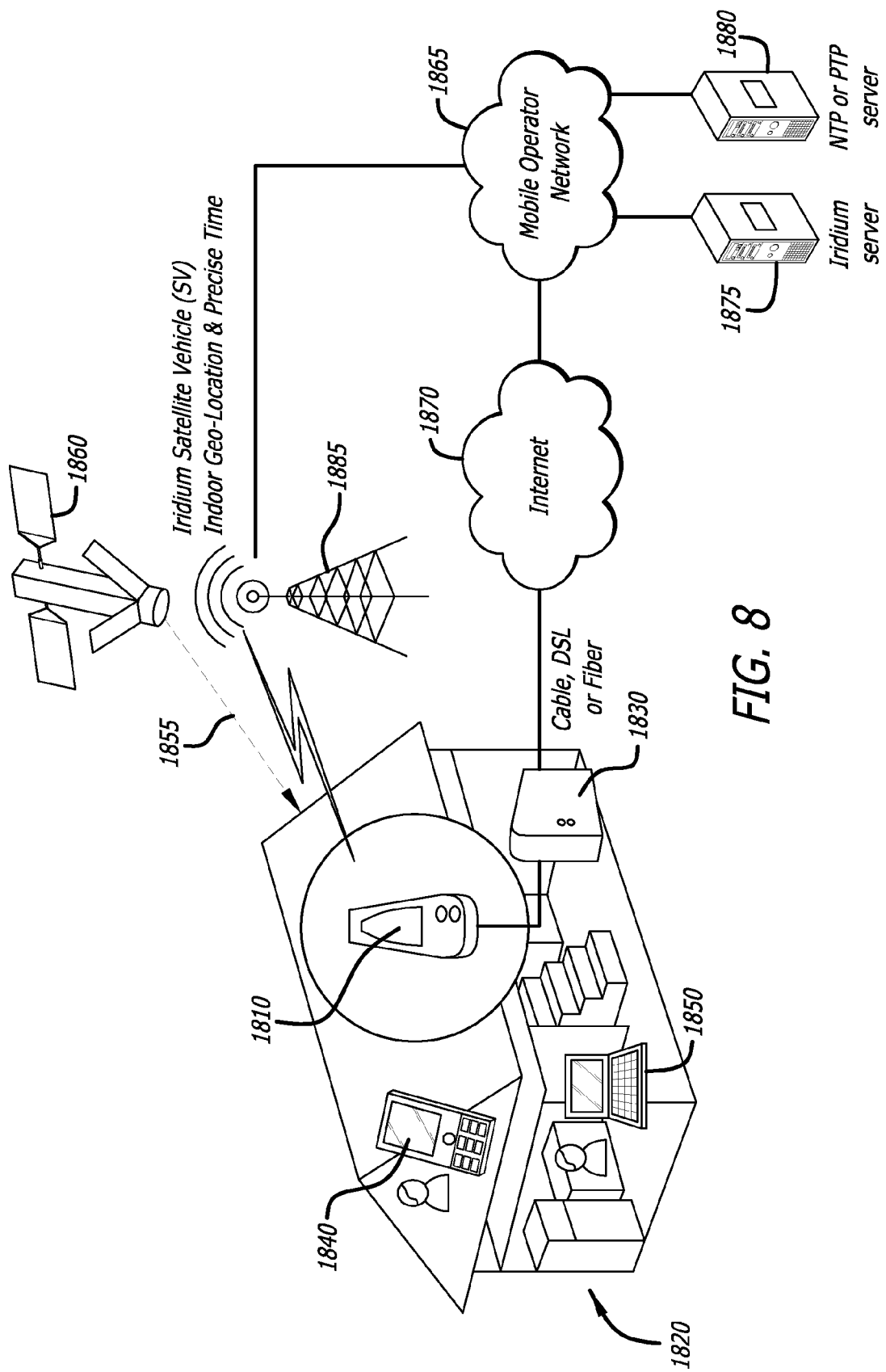

FIG. 8 provides a detailed depiction of a small cell system that is able to perform in occluded or jammed environments according to an embodiment of the present invention.

Figure 9:
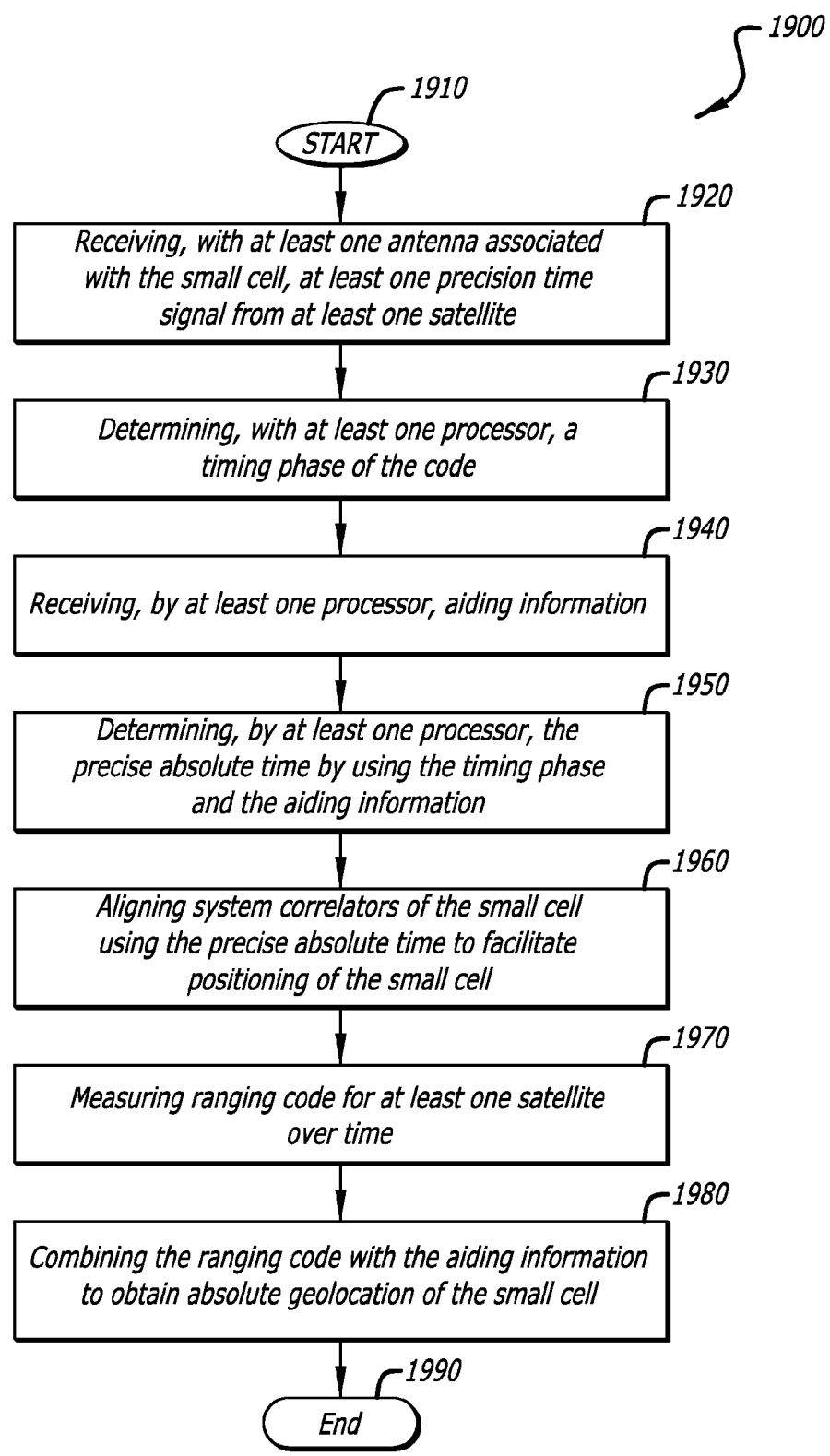

FIG. 9 provides a flow diagram of a method for operation of a small cell system that is able to perform in occluded or jammed environments according to an embodiment of the present invention.

Figure 10A:
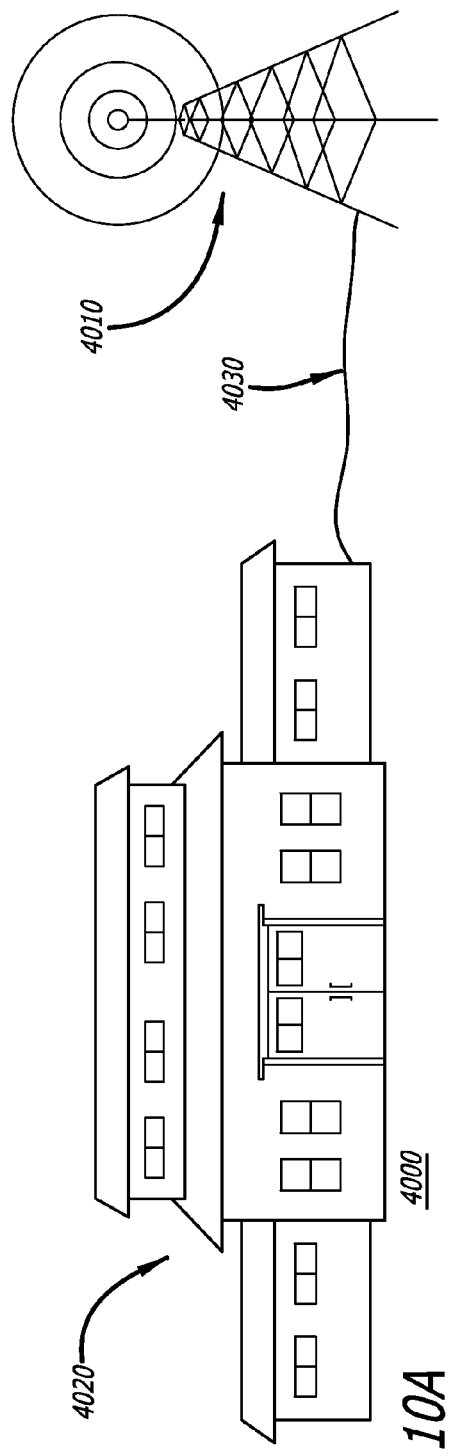

FIG. 10A provides a depiction of a conventional macro-cell system that requires an external antenna to perform.

Figure 10B:
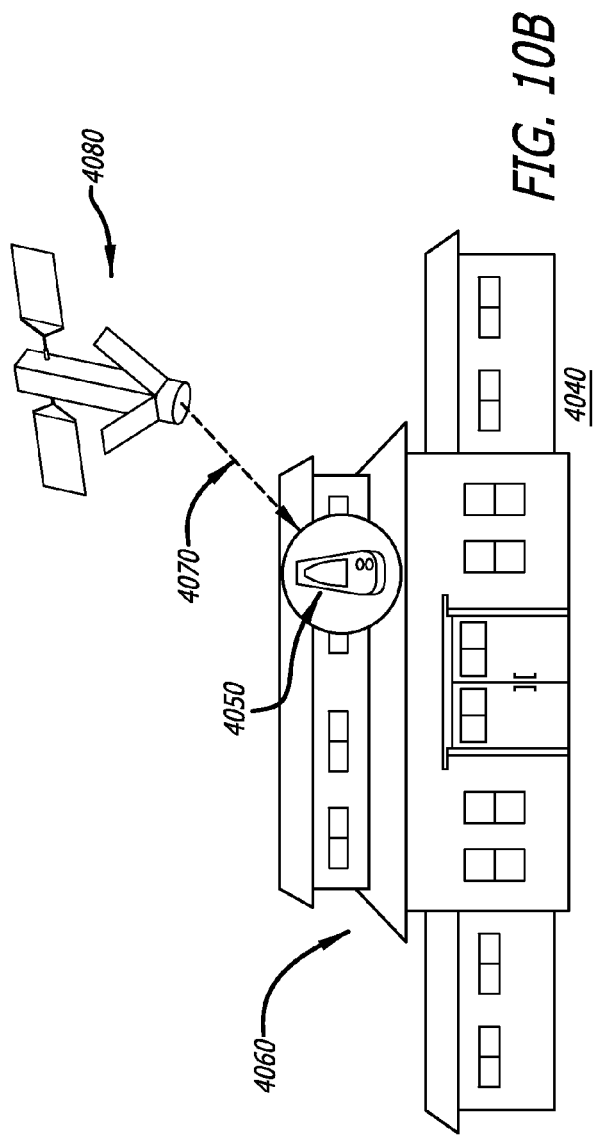

FIG. 10B provides an illustration of a macro-cell system that is able to perform in occluded or jammed environments according to an embodiment of the present invention.

Embodiments of the present invention and their advantages are best understood by referring to the detailed description that follows. It should be appreciated that like reference numerals are used to identify like elements illustrated in one or more of the figures.

DESCRIPTION

In accordance with various embodiments discussed herein, a system employing satellites, for example, low earth orbit (LEO) satellites, may be used to augment receiver units, for example, cell phones, macrocells, small cells (e.g., microcells, picocells, and femtocells) or other compact devices, so that they may function even in heavily attenuated, occluded or jammed environments. Navigation systems according to one or more embodiments herein may address current problems of receiver units that are due to fundamentally weak signals received from existing sources such as Global Positioning System (GPS) satellites.

Signals from certain satellites, for example, communication satellites, are generally more powerful than signals from other existing positioning systems such as GPS. One such satellite is the Low Earth Orbiting Satellite (LEO) constellation Iridium. In an example, a receiver unit configured to work with signals received from a LEO satellite, for example an Iridium satellite, may work with signal levels of less than about 45 dB of attenuation at the receiver unit's antenna, whereas GPS-configured receiver units typically will not work at such levels. By leveraging Iridium satellite signals, the Iridium-configured receiver unit may operate at about 15-20 db below where a typical GPS-configured receiver unit would stop working.

According to various embodiments, such powerful signals, which include precision time signals from the satellite system, may be used to determine a precise absolute time to an accuracy of, for example, approximately 1-10 microseconds. Also, such powerful signals may be transferred to a receiver unit along with information from other ground based infrastructure, such as a cellular network, an internet network, or WiFi. According to one or more embodiments, the precise absolute time derived from the satellite signals is sufficiently accurate to facilitate aligning system correlators in a receiver unit to focus in very narrow periods of time. When multiple system correlators are used without the benefit of a precise time reference in occluded or jammed environments, the correlation process is computationally burdened by searching over large time periods and the receiver unit may not be able to perform under such conditions. However, with the transfer of precise absolute time (e.g., having an accuracy within approximately 10 microseconds) a receiver unit (or user) may better receive and track navigation signals from a positioning system such as GPS by aligning the receiver unit's system correlators even in highly attenuated or jammed environments. Thus, embodiments of the present invention may aid GPS or any other positioning satellite system in heavily attenuated or jammed environments. It should be appreciated that precise absolute time transfer may also be used in other applications such as network synchronization.

Figure 1:
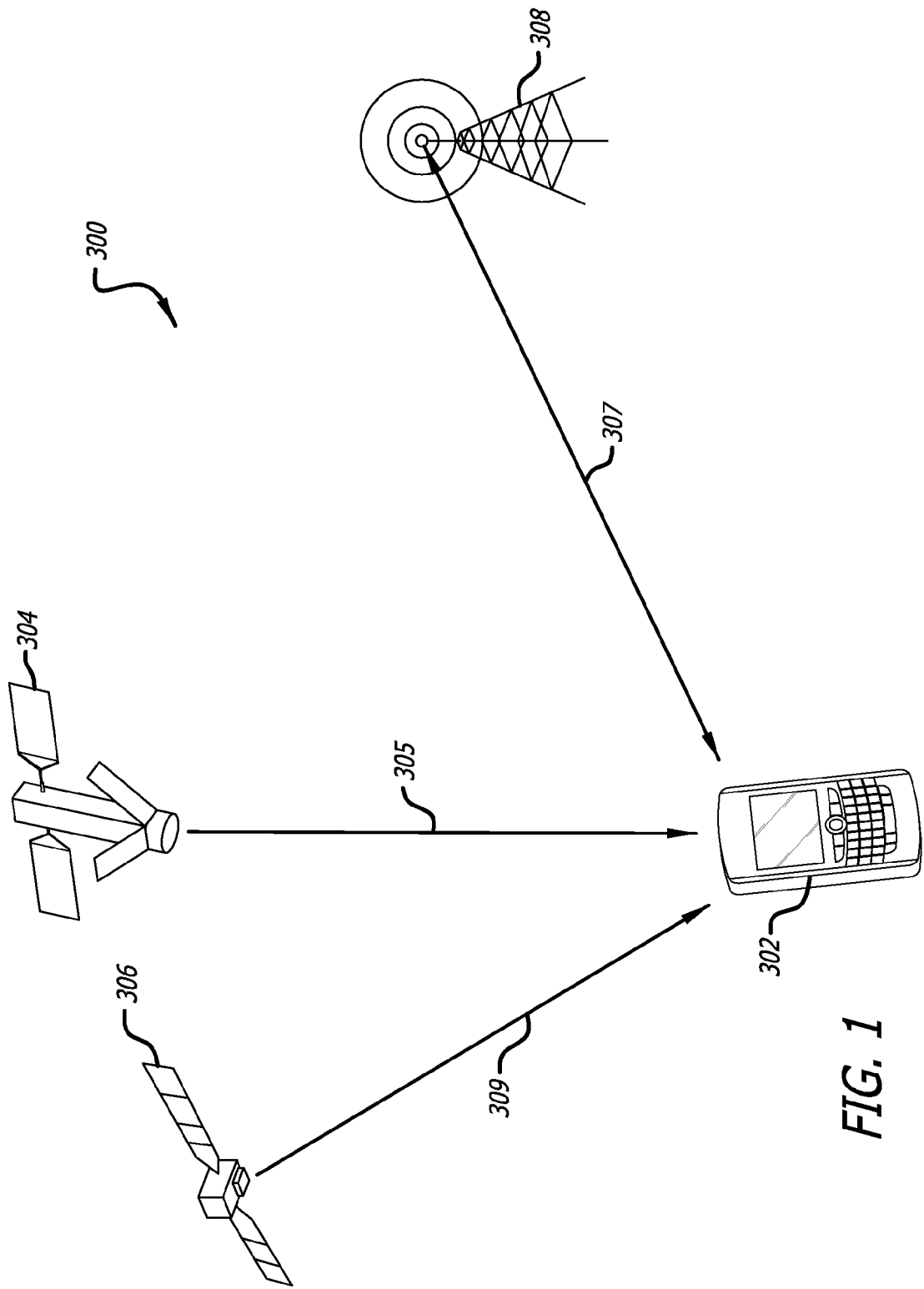

Referring now to the figures wherein the showings are for purposes of illustrating embodiments of the present invention only, and not for purposes of limiting the same, FIG. 1 provides an overview of a navigation system 300 that is able to perform in occluded or jammed environments according to an embodiment of the present invention.

As shown in the embodiment of FIG. 1, in navigation system 300, a receiver unit 302 (e.g., a cellular telephone), is configured to receive signal 309 from a satellite 306, which may include a global positioning system (GPS) signal (e.g., protected and/or unprotected GPS signal) from conventional navigation satellites. In addition, receiver unit 302 is configured to receive signal 305 from a satellite 304, which may be a low earth orbit (LEO) satellite. Furthermore, receiver unit 302 is configured to receive signal 307 from a network 308, which may include, for example, a cellular network, an Internet network, a WiFi network, and/or other networks. Signal 305 received from satellite 304 comprises a precision time signal coded on satellite 304. Signal 307 received through network 308 may include additional aiding information such as, for example, orbit information associated with satellite 304, an approximate location of receiver unit 302, an approximate range between satellite 304 and receiver unit 302 (e.g., within approximately 3000 m), approximate time information (e.g., approximate time within about 5 seconds), timing bias information associated with satellite 304 (e.g., satellite clock offsets), and/or other information.

According to one or more embodiments, satellite 306 may be a part of an integrated high-performance navigation and communication system such as an iGPS system. Satellite 306 may also be a part of any other positioning system satellite, including for example, the Global Orbiting Navigation System (GLONASS).

In one example, satellite 304 may be a LEO satellite, which may be implemented by a satellite of an existing communication system (e.g., Iridium or Globalstar satellite systems). In one example where an Iridium satellite is used to implement satellite 304, flight computers of the Iridium satellite may be reprogrammed with appropriate software to facilitate the handling of navigation signals. In another example where a Globalstar communication satellite is used to implement satellite 304, the satellite bent pipe architecture permits ground equipment to be upgraded to support a variety of new signal formats.

In embodiments where satellite 304 is implemented as a LEO communication satellite, the LEO communication satellite may be configured to support communication signals as well as navigation signals. In this regard, such navigation signals may be implemented to account for various factors such as multipath rejection, ranging accuracy, cross-correlation, resistance to jamming and interference, and security, including selective access, anti-spoofing, and low probability of interception.

Receiver unit 302 may be implemented with appropriate hardware and/or software to receive and decode signals from a variety of space and terrestrial ranging sources to perform navigation. Such signals may include, for example, satellite broadcasts from GPS (or any other positioning system (e.g., GLONASS), LEO (e.g., Iridium or Globalstar satellite systems), Wide Area Augmentation System (WAAS), European Geostationary Navigation Overlay Service (EGNOS), Multifunctional Satellite Augmentation System (MSAS), Galileo, Quasi-Zenith Satellite System (QZSS), and/or Mobile Satellite Ventures (MSV) satellites. Such signals may also include terrestrial broadcasts from network 308, which may include cellular networks, TV networks, Internet networks, WiFi, WiMAX, National Vehicle Infrastructure Integration (VII) nodes, and other appropriate sources. Receiver unit 302 may be implemented in accordance with various embodiments set forth in U.S. patent application Ser. No. 11/268,317 filed on Nov. 7, 2005 which is incorporated herein by reference.

Receiver unit 302 may be further configured to receive and perform navigation using broadcasted signals of other space and terrestrial ranging sources as may be desired in particular embodiments. In addition, receiver unit 302 may be configured with an inertial measurement unit (IMU) implemented, for example, as a microelectromechanical system (MEMS) device to provide jamming protection.

Receiver unit 302 may also be implemented in any desired configuration as may be appropriate for particular applications. For example, in various embodiments, receiver unit 302 may be implemented as a cellular telephone, an iGPS receiver, a handheld navigation device, a vehicle-based navigation device, an aircraft-based navigation device, or other type of device. In an embodiment, the position of receiver unit 302 may correspond to the position of a user.

Figure 1A:
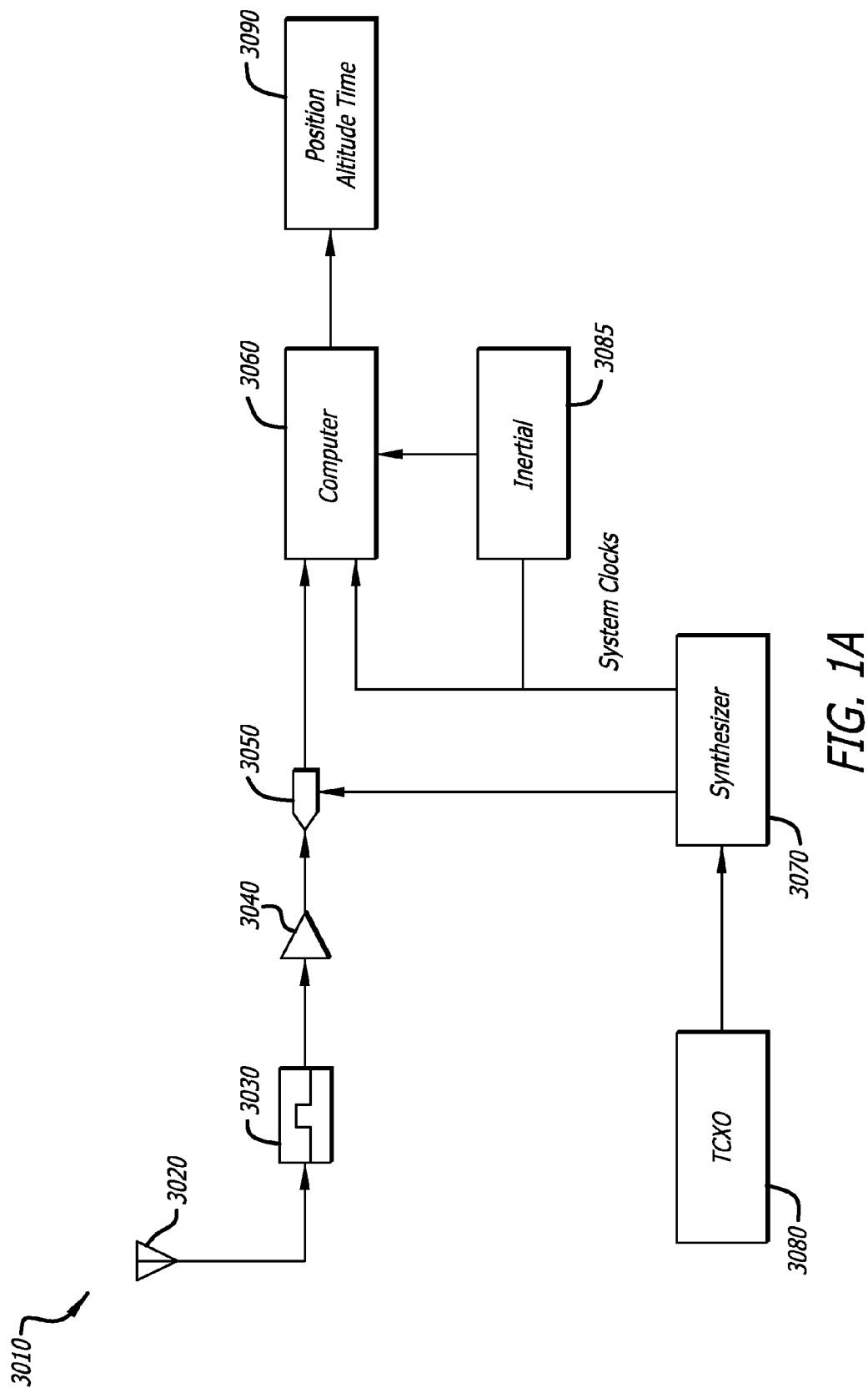

Referring to FIG. 1A, a functional block diagram of receiver unit 302 is shown according to an embodiment of the disclosure. Receiver unit 302 includes a multi-frequency antenna 3020 adapted to receive satellite signals 3010 from one or more satellites. Antenna 3020 may also be adapted to receive signals from network 308 of FIG. 1, for example. Antenna 3020 is coupled to one or more pre-select filters 3030, an amplifier 3040 and an A/D converter 3050. Synthesizer 3070 receives a signal from temperature controlled crystal oscillator (TCXO) 3080, and is coupled to A/D converter 3050, inertial 3085 and computer 3060, which comprises a memory and a processor (not shown). System correlators may be implemented by the processor. Computer 3060 receives raw measurements from inertial 3085 as well as input from synthesizer 3070 and A/D converter 3050 to produce an output of position, altitude, and time 3090. The sampling rate of A/D converter 3050 may be appropriately determined such that receiver unit 302 may downconvert to baseband all bands of interest.

In operation, according to one or more embodiments, in locations where receiver unit 302 is occluded or jammed and cannot receive signal 309 (e.g., GPS signal) from satellite 306, receiver unit 302 may send a message to network 308 requesting assistance. Network 308 then determines additional aiding information. Receiver unit 302 then uses signal 307, which comprises the additional aiding information obtained through network 308 in combination with signal 305 received from satellite 304, which comprises a precision time signal, to align its system correlators to improve reception of signal 309 (e.g. GPS signal) from satellite 306 and therefore be able to perform navigation even in occluded or jammed environments.

Figure 2:
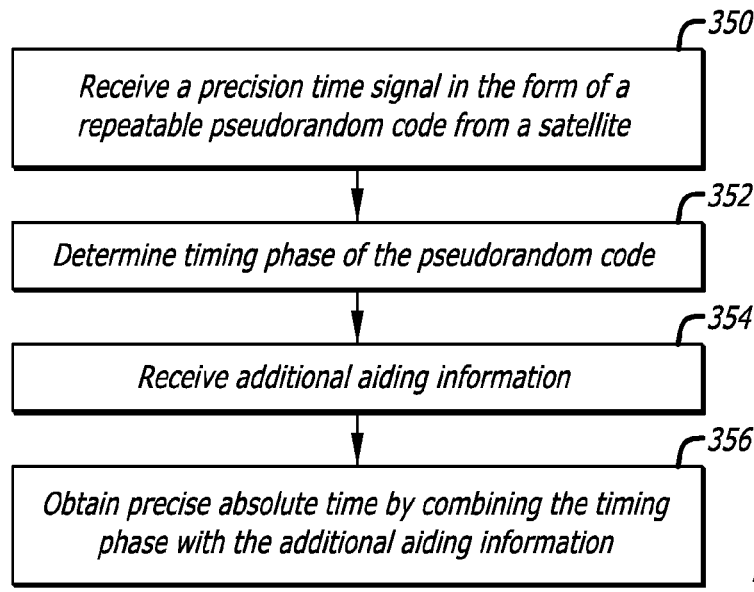

Referring now to FIG. 2, a flow diagram is provided that illustrates a method of obtaining precise absolute time transfer from a satellite according to an embodiment of the present invention. In an embodiment, FIG. 2 may be implemented for use with navigation system 300 of FIG. 1, but it may also be implemented for use with other systems or applications, such as network synchronization. Signal 305 received from satellite 304 (as shown in FIG. 1) permits localization when combined with signal 307, which comprises additional aiding information. The additional aiding information may be delivered to receiver unit 302 through network 308.

In block 350, receiver unit 302 receives signal 305, which comprises a precision time signal, from satellite 304. The precision time signal is received as a well-defined code that repeats periodically from satellite 304. It will be appreciated that a well-defined code may include any number of codes, for example, a pseudorandom code. In an example, an Iridium satellite may broadcast a pseudorandom code that repeats approximately every 23 seconds. Other implementations may include an alternating code structure. For example, in one such implementation, a coarse timing code may be followed by a pseudorandom code. In this implementation, the coarse timing code may comprise a repeating segment of pure carrier frequency which may be easily detected by receiver unit 302 for use with various operations, such as determining Doppler shift. The pseudorandom code in this implementation may be used to determine absolute time to high accuracy, but may be more difficult for receiver unit 302 to detect than the coarse timing code. In this regard, the coarse timing code may be used by receiver unit 302 to efficiently determine the approximate times at which the pseudorandom code is expected to be received.

In various embodiments, signal 305 received from satellite 304 is not required to include detailed navigation information and only one broadcast of signal 305 from a single one of satellites 304 may be used to initiate the aiding technique. Furthermore, the timing accuracy of signal 305 may be sufficiently degraded from typical GPS satellite performance, but accuracy on the order of 10 microseconds is sufficient. In one example, receiver unit 302 may operate in an attenuated or occluded environment (e.g., indoors) where the receiver unit 302 is able to receive signal 305 from satellite 304, but unable to receive signal 309 from satellite 306 due to the lower power of signal 309 and the attenuation of the environment. For Iridium satellites, for example, the structure of the repeatable pseudorandom code allows the receiver unit 302 to lock onto the pseudorandom code even in heavily attenuated environments up to about 45 dB attenuation at the antenna, that is, about 15 dB beyond where most GPS receivers fail to receive. Receiver unit 302 may also operate, for example, in environments where signal 309 is potentially jammed by a competing signal in a commercial scenario, or where signal 309 is intentionally jammed by an enemy in, for example, a military scenario.

In block 352, the relative timing phase of the code (also referred to as "n" or "code phase" below) of signal 305 from satellite 304 is determined by receiver unit 302 using low data rate correlation. For example, receiver unit 302 may be used to lock onto the code of the high power non-GPS precision time signal provided by signal 305 and determine the timing phase to within less than about 3 microseconds.

In block 354, receiver unit 302 receives signal 307, which includes additional aiding information through network 308. Alternatively, the additional aiding information may be received from satellite 304 in the case where, for example, receiver unit 302 is moving in and out of attenuated environments. In general, the update rate of the additional aiding information is rather low and could in principle be stored for 24 hours or longer. In one embodiment, the additional aiding information may comprise: the starting time of the code broadcasts, the expected frequency of the timing transmissions, a model of the non-GPS satellite orbits, and time bias correction information that may improve the fidelity of the precision time signal received from satellite 304 as described in block 350. Additionally, approximate time (e.g., within several seconds of accuracy) may be provided through network 308 or by a local clock of receiver unit 302.

In block 356, the timing phase of the code is converted to precise absolute time by combining the timing phase of the code with the additional aiding information that may be received through network 308 according to, for example equation 406 that will be described below with respect to FIG. 3.

Figure 3:
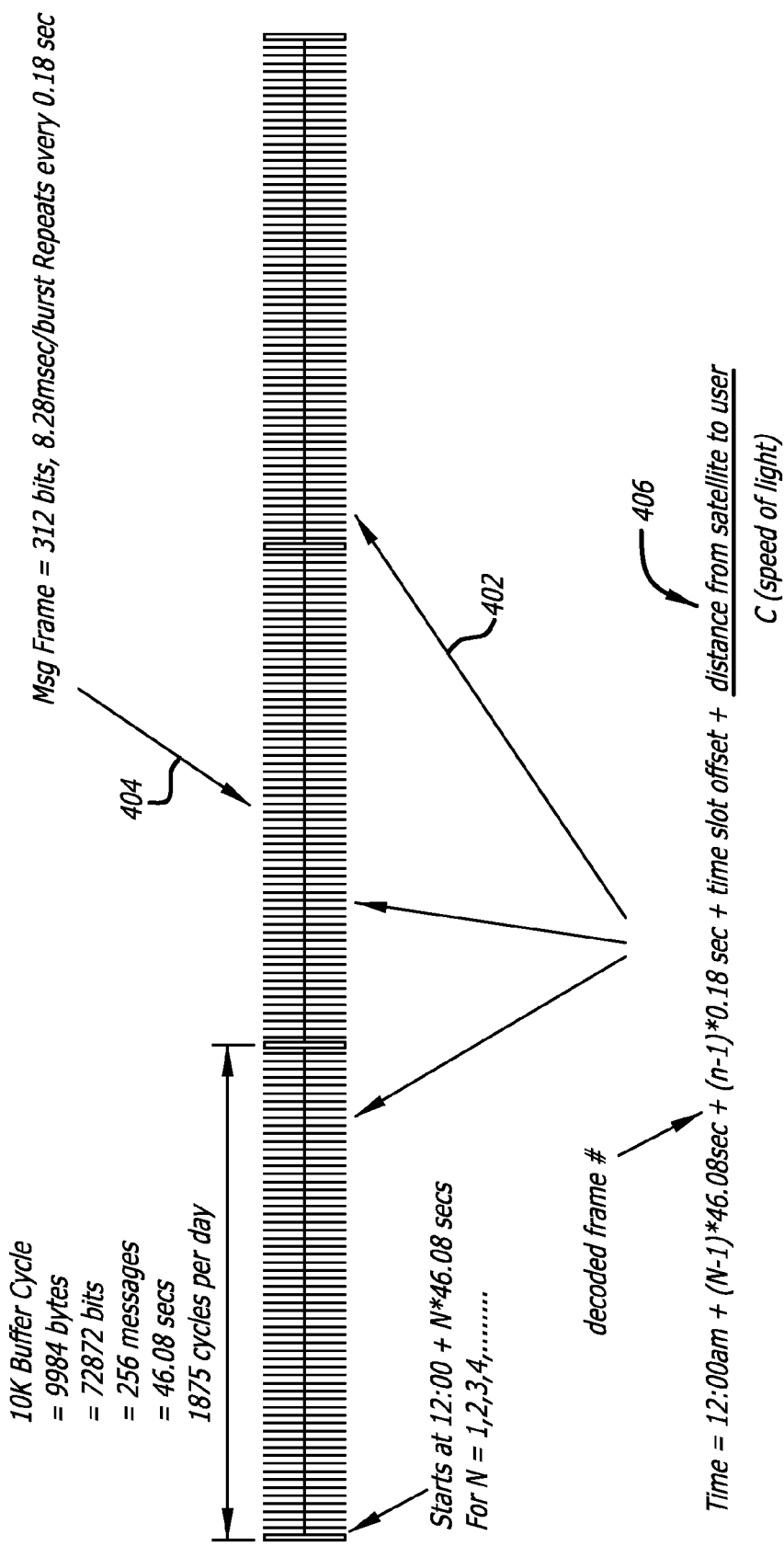

Referring now to FIG. 3, a time transfer structure signal of a low earth orbit (LEO) satellite is illustrated according to an embodiment of the present invention. The time transfer structure of FIG. 3 may be implemented for use in navigation system 300 of FIG. 1 according to an embodiment, but it may also be used in other systems or applications such as network synchronization. In this embodiment, satellite 304 is implemented with an Iridium satellite. It will be appreciated that although the time transfer signal for an Iridium satellite is illustrated, the description herein may be modified as appropriate for other satellite systems. In the example of FIG. 3, signal 305 may comprise 10K buffer cycles 402 that are repeatedly broadcasted by each satellite 304. Each 10K buffer cycle may be equal to 9984 bytes, or 72872 bits, or 256 messages, or 46.08 seconds. There are 1875 buffer cycles per day. A message frame 404 (also referred to as a message) is also illustrated, which may be equal to 312 bits or 8.28 milliseconds per burst. Other bits may be predefined by satellite 304. The 312 bits of message frame 404 are generally payload bits where communications, for example, telephone calls, occur with a voice update every 90 milliseconds. Each frame repeats every 0.18 seconds and all bits may be used to detect the edge of message frame 404. A burst may be offset by a specified "time slot" within the message frame 404.

If, for example, a pseudorandom code is 312 bits, there is a full buffer with 256 messages. In this example, each message has its own pseudorandom code such that it is not confused with other codes. The pseudorandom code may repeat approximately every 20-40 seconds. A known, simple pseudorandom code (or other code) may be employed to distinguish between the 256 messages and provide significant processing gain. In one embodiment, alternating between a coarse simple code (e.g., that promotes the detection of the carrier frequency) and a more precise pseudorandom code (e.g., that permits more accurate time alignment) may be performed.

In one example, receiver unit 302 may be used to determine what time it is. A buffer is loaded and broadcasting starts. The receiver unit 302 tunes into the right frequency and finds bits in the L band frame. The receiver unit 302 finds a code that matches an nth message of the buffer. However, this does not tell what time it is, only that it is the nth message (or the "code phase" of the repeating code).

The timing phase information and the additional aiding information as described in blocks 352 and 354 of FIG. 2 may be combined as set forth in block 356 of FIG. 2 to form an equation to obtain precise absolute time as in the following example with respect to the embodiment of FIG. 3, where equation 406 is used to determine time. In equation 406, it is assumed that 256 unique messages repeat every 46.08 seconds:

$$\text{Time}=12:00 \text{ am start time}+(N-1)*46.08 \text{ sec}+(n-1)*0.18 \text{ sec}+\text{Time}$$

$$\text{Bias}+\text{Range}/C(\text{speed of light})$$

Here, a known start time of the satellite 304 buffer playback, which may be delivered via data link, may be 12:00 am at a defined date, as illustrated in equation 406 of FIG. 3. "N" (also referred to as "current buffer cycle") is the number of times the pseudorandom code block of 256 messages has repeated since the start time. In one embodiment, "N" may be determined by a local clock of receiver unit 302 with accuracy of about less than 10 seconds. If the message broadcasts at 12:00 am, for example, and receiver unit 302 has a clock synchronized to network 308, receiver unit 302 may determine the current buffer cycle "N". That is, the receiver unit 302 helps resolve the number "N" based on certain known variables.

"n" is the code phase within the repeating sequence. In the example of equation 406, a time message plays every 0.18 seconds and comprises 256 unique pseudorandom messages. Afterwards, the pseudorandom code repeats from the beginning. Therefore "n" is a number between 1 and 256. "n" is measured from satellite 304 using, for example, the pseudorandom code, and it is accurate to less than 10 microseconds.

If receiver unit 302 knows which message is received, then the code phase "n" may be determined. Receiver unit 302 may perform a correlation to determine which message was received even in the presence of noise. For example, if noise is present, random bits may be received, then the message, then random bits again. Thus, the message may be corrupted by noise and may include corrupted bit values. Assuming that a long message is sent, for example, a 1000 bit message, the bits may be compared to the bits received. If, for example 980 bits are correct, then the next 1000 bits are compared and so on until a peak is reached. A peak is reached when the number of correct bits is greater than the average number. In the example of sending a message of 1000 bits, if the peak is, for example, 600, then it is determined that that is the correct message. Thus, the message is received and statistically determined in the presence of noise at a particular time. A method for determining the code phase "n" of a received satellite signal will be described in FIG. 3A below according to an embodiment.

"Time Bias" may represent any timing bias in system 300, for example, and may compensate for measured errors in the clock of satellite 304 and/or known time slot changes in the transmission sequence. Time slots may be provided by satellite 304, or they may be measured by a reference station, or they may be fixed or predictable as part of the service. In the example of FIG. 3, Iridium's message frame of 90 milliseconds may be broken up into time slots. As shown in FIG. 3, bursts may occur and may be offset by a specified time slot within the message frame. Receiver unit 302 may know which time slot to use through network 308. Network 308 provides basic information such as the frequency of transmission, that is, the sub band of the transmission, which changes frequently depending on, for example, the frequency of broadcasting and/or other factors.

"Range" represents the distance between satellite 304 and receiver unit 302, and is computed using an orbit model for satellite 304 that may be delivered via data link, suitably accurate knowledge of the position of receiver unit 302, and approximate time (as an input to a satellite orbit model). In one embodiment, to obtain an accuracy within about 10 microseconds, the range estimate must be accurate to about 3000 m, which may equate to about 20,000 m of horizontal accuracy on the ground. This level of positioning may be easily achieved, for example, via cell network techniques. Additionally, simple beam coverage methods may be employed to determine the position of receiver unit 302 based on the knowledge of which non-GPS satellite beam the user is presently located in and the recent beam time history. Numerous other methods of coarse positioning may also be suitably employed. In one embodiment, satellite orbit information (ephemeris) for satellite 304 includes information such as the location of satellite 304 within a constellation of satellites at various points in time and other information that can be used by receiver unit 302 to accurately obtain clock values from satellite 304. In this embodiment, network 308 may easily determine the location of receiver unit 302 (or the user) within less than one kilometer. The range may be accurate to about 3 kilometers. The approximate time of receiver unit 302 may be used with the orbit information to determine the location of satellite 304. After the range of satellite 304 is determined, it is then divided by the speed of light (also referred to as "C").

Figure 3A:
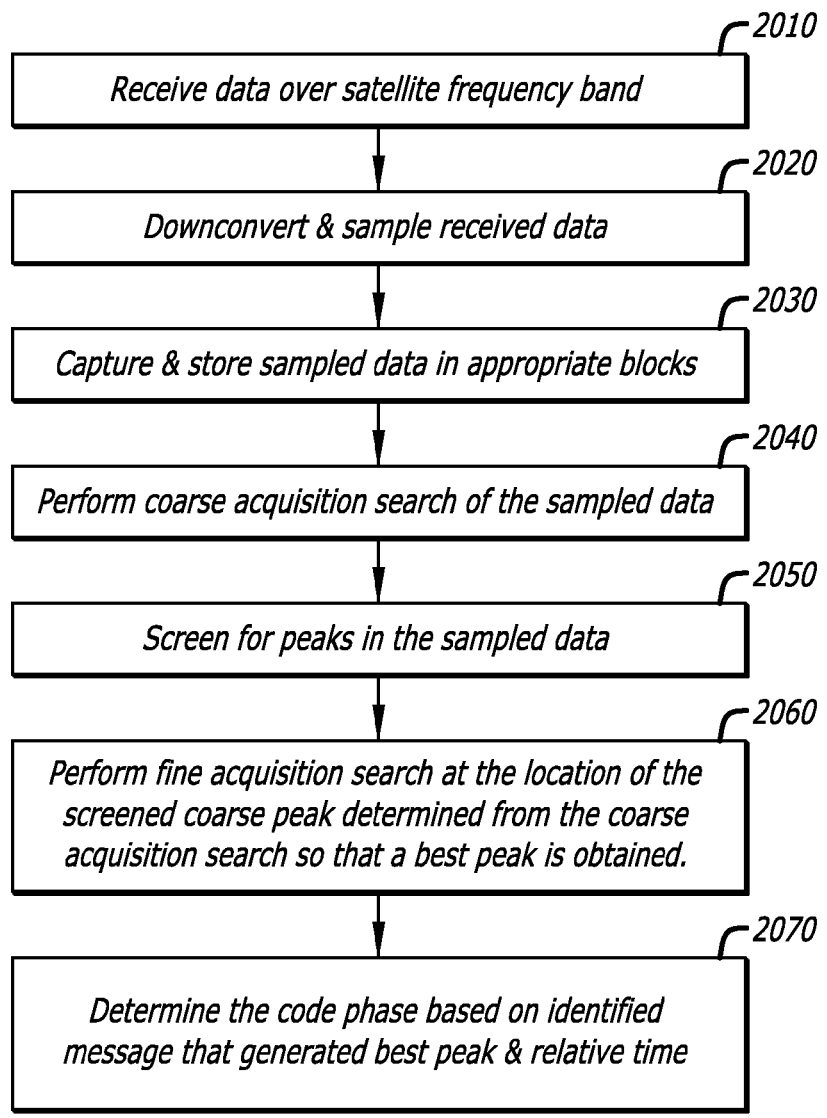

FIG. 3A shows a flow diagram of a method for determining the code phase of a received satellite signal according to an embodiment. FIG. 3A is an example wherein satellite 304 comprises an Iridium satellite. In block 2010, a signal comprising data may be received from an Iridium satellite and collected over the entire Iridium frequency band with a receiver unit having an appropriate antenna, an amplifier and a downconverter (as shown in FIG. 1A). In block 2020, the received data may be downconverted, for example, by 1606 MHz, and the data may be sampled, for example, at 50 samples per second.

In block 2030, the sampled data may be captured and stored in memory in appropriate blocks, for example, in blocks of one second segments.

In block 2040, a coarse acquisition search of the sampled data is performed. In this example, approximately 9 ms of data may be selected for detailed processing. Doppler of the captured data may be estimated using a known orbit model and an estimated time. The data may be digitally demodulated with sine and cosine functions based on a known (or estimated) frequency sub-band and access. Demodulation also includes the estimated Doppler frequency. The data may then be decimated by a factor of, for example, approximately 111. A Fast Fourier Transform (FFT) may be used on the decimated data to determine the highest peak and associated frequency. It should be noted that the associated frequency may be used to further improve demodulation in the next iteration. Demodulation in general would yield a DC result, however, imperfect Doppler estimates generally generate a low frequency component. Next, the following 1 millisecond block of sampled data may be considered and the process may be repeated.

In block 2050, the processed data is screened for peaks performing consistency checks. For example, peaks should be separated by "n"*90 milliseconds.

In block 2060, once peaks are screened, fine acquisition may be performed at the location of the coarse peak+180 milliseconds−0.5*window. The window represents the range in time where the code is expected to be found. For example, the received data may be correlated against the 128 non-zero messages in the code; the highest correlation peak may then be recorded; and the time step may be incremented by a certain number of microseconds. This process may then be repeated for the duration of the window.

In block 2070, the code phase may be determined by the receiver unit when the data was captured by knowing which message generated the best peak and knowing the relative time.

Once the code phase is determined, precise absolute time may be determined as described above with respect to equation 406 of FIG. 3.

After precise absolute time is computed according to the techniques described above according to one or more embodiments, the precise absolute time may be used in numerous applications such as network synchronization or as an aid to a positioning system such as GPS.

In the positioning aiding embodiment, the precise absolute time determined as described above may be employed to "focus" or align correlators of receiver unit 302, for example a GPS receiver. In this case, a GPS receiver may have numerous parallel positioning system correlators which, when sufficiently time-aligned (e.g., using the techniques described herein), may be able to lock on to signal 309, for example a GPS signal, from satellite 306, for example a GPS satellite, even in a jammed or attenuated environment.

Receiver unit 302 may also compensate for Doppler shift, which refers to a change in frequency of emitted waves produced by motion of an emitting source relative to an observer. As a satellite moves through the sky, the transmission frequency of the satellite signals changes. By using its knowledge of time, receiver unit 302 may predict and compensate for Doppler shift such that the correct frequency may be acquired. In one embodiment, Doppler shift may be calculated by the following equation:

Doppler=range rate/$C$*normal frequency of transmission

As discussed above, the range to satellite 304 is the distance between the locations of receiver unit 302 and satellite 304. The range rate is a function of range and time not unlike for example, the measurement of velocity based on the distance traveled between two different points in time. Finally, in the Doppler equation above, the nominal frequency of transmission for an Iridium satellite, for example, may be on the order of 1.6 GHz. "C" refers to the speed of light.

Network 308 provides satellite information as well as pretuning information for signals such that as Doppler shift occurs, the signals change to stay in tune accordingly.

The Doppler profile of satellite 304 may also aid in determining timing information. Receiver unit 302 may monitor various signals 305 received from satellite 304 over time. By determining the Doppler shift that occurs as satellite 304 moves overhead, receiver unit 302 may obtain a precise determination of the position of receiver unit 302 and timing information. Thus, with reference again to equation 406 in FIG. 3, the estimate of the location of receiver unit 302 may be performed by referring to the Doppler profile of satellite 304.

Thus, in the embodiments described above, precise absolute time according to equation 406 may be conveyed to receiver unit 302 where there is a ground network (e.g., network 308) to support a space network (e.g., one or more of satellites 304 and/or 306).

In another embodiment, which will be described in more detail with respect to FIG. 3B below, precise absolute time may be achieved in the absence of additional aiding information provided as described above by using, for example, the native L band burst structure signal of an Iridium satellite. In various embodiments, satellite 304 may be a LEO satellite such as Iridium and satellite 306 may be a GPS satellite. In such embodiments, it is known that an Iridium satellite uses frequencies according to an L band structure from 1610 MHz to 1625 MHz. GPS carriers are also in the L band, centered at 1176.45 MHz (L5), 1227.60 MHz (L2), 1381.05 MHz (L3), and 1575.42 MHz (L1) frequencies. Because of the proximity between the Iridium and GPS frequencies, receiver unit 302 is capable of receiving signals together from both satellite systems, Iridium and GPS satellite systems, without the need for an extra antenna.

Each Iridium satellite maintains an internal clock that is monitored and maintained to an accuracy of within 10 microseconds with respect to Coordinated Universal Time (UTC, Fr. Temps Universel Coordonne, also known as Greenwich Mean Time or Zulu time) without clock drift. Thus, L band signals provided by Iridium satellites may be accurately tied to UTC time within approximately 10 microseconds. The L band Iridium satellite signals are structured with 90 millisecond frames. Thus, by determining the edges of L band frames of Iridium satellite signals, accurate timing information may be obtained.

Referring now to FIG. 3B, a flow diagram illustrating a method of performing time transfer and navigation in attenuated or jammed environments according to an embodiment of the present invention is provided. The method illustrated in FIG. 3B may be implemented with the navigation system of FIG. 1, except that in this embodiment, additional aiding information provided via network 308 is unavailable.

In block 502, the broadcasted frame structure of signal 305 (e.g., when implemented by L band Iridium satellite signals) from satellite 304 is detected by receiver unit 302. Even without a well-defined or refined code, it is possible for receiver unit 302 to detect the L Band frame of the Iridium transmission signals. Because in this embodiment it is assumed that additional aiding information is unavailable from network 308, receiver unit 302 prepares successive guesses or estimates of absolute time. With sufficient prior knowledge the number of time estimates may often be bound to a reasonable number. For example, within 100 frames of the Iridium frame structure there is a GPS second that lines up. Thus, the number of time estimates or guesses may be reduced to 100 times.

In block 504, once successive estimates are produced, a local clock of receiver unit 302 is aligned to the frame structure of signal 305 of satellite 304.

In block 506, multiple time estimates that are respectively separated according to the frame structure signals are generated wherein at least one time estimate is aligned to signal 309 of satellite 306.

In block 508, the time estimates may be provided to parallel correlators of receiver unit 302. The parallel correlators are then aligned according to the time estimates.

In block 510, the time estimate that is aligned to signal 309 of satellite 306 is identified and provides aiding information to receiver unit 302. This aiding information significantly improves the ability of receiver unit 302 to efficiently detect signal 309 of satellite 306. That is, as discussed above according to an embodiment where an Iridium satellite is used to implement satellite 304, it is possible to leverage numerous parallel phone calls, for example, to determine the frame edge of the satellite signal frame structure. In this example, Iridium has a frame structure of 90 milliseconds. Within every 100 frames, there is a corresponding GPS second that lines up therewith. Therefore, by simply knowing the frame edge, GPS processing is significantly improved as it is easier to obtain aiding information by trying 100 frames than by trying an infinite number of estimates.

The systems and methods described above with respect to FIGS. 1-3B for obtaining a precise absolute time according to one or more embodiments may be used to facilitate indoor navigation by instantaneously initializing a survey of a wireless network station (e.g., a WiFi transceiver, a WiFi-compatible device, 802.11-compatible device, or other wireless device). According to one or more embodiments, by using the precise absolute time described above, wireless network stations (e.g., Internet hotspots and/or other types of wireless network stations) may act as positioning beacons (with a surveyed location) for receiver unit 302. As a result, a roaming user of receiver unit 302 may navigate in indoor environments.

FIG. 4 provides a self forming navigation system 300a that uses satellites to permit wireless network station localization according to an embodiment of the present invention. In FIG. 4, a receiver unit 302a may be configured to receive ranging signals 701, 703, and 705, which may comprise aiding information from wireless network stations 702, 704, and 706. Each wireless network station 702, 704, and 706 is in signal communication with network 708 and also receives precision time and ranging signals 710 from satellite 304a. In one embodiment, the position of a receiver unit 302a may correspond to the position of a roaming user.

It will be appreciated that wireless network stations 702, 704 and 706 may include WiFi transceivers as well as other wireless network station devices, configurations, and/or networks. In addition, network 708 may include the Internet or other appropriate networks such as cellular networks or TV networks.

Referring to FIG. 5, a flow diagram illustrating a method for performing geolocation by integrating satellite signals and wireless network station signals is provided according to an embodiment of the present invention. The flow diagram of FIG. 5 may be implemented for use in the navigation system of FIG. 4. In this embodiment, satellite signals from, for example, Iridium satellites and GPS satellites may be integrated with WiFi or 802.11 type signals.

In block 802, receiver unit 302a receives precise absolute timing code signals 710 in the form of a repeatable code such as a pseudorandom code broadcasted from satellite 304a, for example a LEO satellite (as described above according to one or more embodiments with respect to FIGS. 1-3B).

In block 804, receiver unit 302a receives aiding information via wireless network station 702, 704, and/or 706.

In block 806, the precise absolute timing code signals 710 are used with the aiding information from wireless network station 702, 704, and/or 706 to determine precise absolute time to within several microseconds accuracy.

In block 808, system correlators of receiver unit 302a, for example, GPS correlators, are aligned using the precise absolute time to facilitate positioning, for example GPS positioning, in occluded environments.

In block 810, receiver unit 302a surveys the locations of wireless network stations 702, 704, and 706 using the positioning information determined by using the precise absolute time.

In block 812, receiver unit 302a receives location information of wireless network stations 702, 704, and 706, which is transmitted on a ranging code.

In block 814, receiver unit 302a performs absolute geolocation by combining positioning information and ranging information from one or more of wireless network stations 702, 704, and 706.

In one embodiment, a roaming user's position (e.g., a position of receiver unit 302a), if desired, may be reported through wireless network stations 702, 704, and 706 and therefore facilitate user tracking.

FIG. 6 provides a flow diagram illustrating a method for performing geolocation by integrating satellite signals and wireless network signals according to another embodiment of the present invention. The flow diagram of FIG. 6 may be implemented for use in the navigation system of FIG. 4. In this embodiment, positioning of the wireless network stations acting as beacons may also be achieved by integrating, for example, Iridium satellite signals (only) and WiFi or 802.11 type signals (with longer integration times).

It will be appreciated that the method described above with respect to FIG. 5 in blocks 802-806 may be used in this embodiment to determine precise absolute time to within several microseconds accuracy. Once absolute time is determined, in block 910 of FIG. 6, system correlators of receiver unit 302a are aligned by using the absolute time to facilitate positioning in occluded environments.

In block 912, receiver unit 302 measures a satellite ranging code (e.g., an Iridium iGPS ranging code) for multiple satellites over time.

In block 914, assuming wireless network stations 702, 704, and 706 are stationary, the ranging code is combined with satellite information such as orbit information and timing signals.

In block 916, receiver unit 302a computes positioning using multilateration by integrating multiple satellite (e.g. Iridium) passes iteratively.

In block 918, the locations of WiFi transceivers 702, 704, and 706 are surveyed by using the positioning information.

In block 920, receiver unit 302a receives the information on the locations of WiFi transceivers 702, 704, and 706, which is transmitted on a ranging code.

In block 922, receiver unit 302a performs absolute geolocation by combining positioning information and ranging information from one or more WiFi transceivers 702, 704, and 706.

According to an embodiment, a roaming user's position (if desired) may be reported through the wireless network and therefore facilitate user tracking.

To determine ranging, for example, the differential time of arrival may be determined. The WiFi transceivers may send a message to receiver unit 302a, for example, a telephone or a computer, and as soon as it is received a message is sent back to the WiFi transceivers. The processing period of the computer or telephone is known. The WiFi transceivers know how long receiver unit 302a took to respond back to the WiFi transceivers. Thus, the differential time of arrival (DTOA) may be computed and would be equal to the processing period of the receiver unit plus the time it took for the message to get back to the WiFi transceivers.

The systems and methods described above with respect to FIGS. 1-3B for obtaining precise absolute time according to one or more embodiments may be used by small cells to facilitate timing synchronization and indoor geolocation. According to one or more embodiments, by using the precise absolute time described above, small cells may be able to readily obtain their location in indoor environments.

FIG. 7 provides an overview of a small cell system 1700 that is able to perform in occluded (e.g., attenuated 1730) or jammed environments according to an embodiment of the present invention. In one or more embodiments, the disclosed small cell system 1700 employs at least one small cell 1710.

A small cell is a low-powered radio access node that operates in a licensed and/or unlicensed radio frequency (RF) spectrum. With mobile service providers struggling to support the growth in mobile data traffic, many mobile service providers are currently employing small cells to offload some of the mobile data traffic from cell towers. Small cells essentially act as small cellular base stations, and are typically designed for use in a home or a small business. A small cell connects to the mobile service provider's network via broadband, such as a digital subscriber line (DSL), cable, or fiber. Currently, small cells are available for a wide range of air interfaces including, but not limited to, Global System for Mobile Communications (GSM), Code Division Multiple Access 2000 (CDMA2000), Time Division Synchronous Code Division Multiple Access (TD-SCDMA), Wideband Code Division Multiple Access (W-CDMA), Long Term Evolution (LTE), and World Interoperability for Microwave Access (WiMax).

Current small cell designs typically support two to four active mobile phones in a residential setting, and eight to sixteen active mobile phones in an enterprise setting. A small cell has a range of ten meters within urban and in-building locations to two kilometers for rural locations. There are three main types of small cells, which are classified by their range of operation. The three main types of small cells are: (1) microcells that have a range of approximately two kilometers to 200 meters, (2) picocells that have a range of approximately 200 meters to 10 meters, and (3) femtocells that have a range of approximately 10 meters. Small cells are advantageous because they allow mobile service providers to be able to increase their service capacity, and to extend their service coverage, especially in some indoor environments.

In order for a small cell to operate, a brief one-time installation process must occur. For this process, the small cell must be connected to the mobile service provider's network and initialized. A small cell can be connected to the mobile service provider's network via broadband. After the small cell is connected to the mobile service provider's network, the user of the small cell must then declare which mobile phone numbers are allowed to connect to the small cell. This is usually performed via a web interface that is provided by the mobile service provider.

After the small cell is connected to the mobile service provider's network and the mobile phone numbers are declared, the small cell must obtain accurate timing and its location. Current, conventional, small cells have Global Positioning System (GPS) receivers for receiving GPS signals from one or more GPS satellites that are in view. These small cells use the GPS signals for time synchronization with the network and for self geolocation. It should be noted that the placement of a small cell has a critical effect on the performance of the network, and the location of the small cell must be addressed for successful deployment. This is because the small cell uses the same frequency as the conventional cellular network (i.e. macrocells and their cell towers) as well as any nearby small cells. As such, it is necessary for the small cell to synchronize its time with the network and for the network to be aware of the location of the small cell so that the network can coordinate the mobile data traffic to prevent any possible jamming or confliction of signals. In addition, it should be noted that the network additionally needs to know the location of the small cell in order to determine which access point base stations to route emergency 911 calls from the small cell. After the small cell has been successfully connected to the mobile service provider's network and initialized, the small cell is operational.

As previously mentioned above, GPS signals are fundamentally weak signals, and have difficulty penetrating into indoor environments, where the majority of mobile usage occurs. As such, current small cells, which employ GPS receivers, often have difficultly receiving GPS signals indoors. In order to overcome this problem, small cells often have to be placed next to a window of the building in order to receive GPS signals. However, even when doing so, there is frequently still some difficultly for the small cells to receive the GPS signals. There are some indoor situations, such as when the building has no windows and thick walls, where the small cells are simply unable to receive any GPS signals at all.

In order to overcome the problem of signal penetration indoors, the disclosed system and method teach small cells that receive high power signals from satellite systems, such as LEO Iridium satellites. Unlike the weak GPS signals, these high power signals are able to readily penetrate into indoor environments.

In addition, it should be noted that since current, conventional, small cells use GPS signals to geolocate themselves, this often can prove problematic due to the difficulty of the small cells to maintain a constant reception of the GPS signals, and for this reason, many mobile service providers have designed their small cell systems such that they only require the location of a small cell to be authorized once during the one-time installation process.

However, this one-time installation process has its own resulting issues that include relying on the user to adequately perform the one-time installation process (which includes geolocation of the small cell itself) and relying on the user to not move the small cell outside of the approved operating area once the small cell has been installed. Currently, some small cell installations (e.g., installations of femtocells) see many failings on the consumer side in regard to the set-up, verification, and installation process, which has an overall negative implication in the business case.

Since the small cells only need to have their locations authorized once, a user could move his small cell to a different location than the authorized location after the one-time installation process has been performed. This could have a deleterious effect on the operation of the small cell system because there could be a jamming or confliction of the small cell's transmission signals with other cell tower signals (which are associated with macrocells) and small cell signals. For example, a user could authorize the location of his small cell in his house during the one-time installation process. The small cell system will cause the small cell to synchronize its transmission signals with the transmission signals of the nearby cell towers and small cells. Then, the user could move his small cell to his mobile recreational vehicle (RV). When the RV travels to other locations, the small cell now located in the RV could be sending transmission signals that are in confliction with the signals of the local cell towers (used by the local macrocells) and small cells. In order to overcome this problem, mobile service providers must periodically authorize the location of the small cells during their operation. Since the disclosed system and method teach small cells that receive high power signals from satellite systems, which are able to readily penetrate into indoor environments, it is possible for mobile service providers to be able to frequently confirm the location of their small cells during operation.

Better understanding of the location of a small cell at a given time allows the small cell to be better controlled and managed. For example, if a small cell moves outside of its approved operating area and if the approved location is well understood, then the provider could lock the small cell (i.e. shut down the operation of the small cell) or alternatively apply appropriate rates and/or additional fees related to the new location. Lastly, better control of the small cell has positive safety implications in emergency 911 (e911) related use cases and applications.

Referring back to FIG. 7, a small cell 1710 is shown to be located in an attenuated environment 1730 inside a building structure 1720, such as a house. The small cell is equipped with an Iridium receiver, and is shown to be receiving at least one precision time signal 1740 from a LEO Iridium satellite 1750. The signal(s) 1740 are in the form of repeatable code (i.e. a correlation code), such as pseudorandom code (e.g., an Iridium signal as described above according to one or more embodiments with respect to FIGS. 1-3B). After the small cell 1710 has received the signal(s) 1740, at least one processor in the small cell 1710 determines the timing phase of the code of the signal(s) 1740.

The small cell 1710 is also shown to receive aiding information from a wireless service provider server 1760 via the internet, either wirelessly and/or by wire. The wireless service provider server 1760 is shown to have obtained the aiding information from an Iridium server 1770. The aiding information may include orbit information associated with the satellite 1750, an approximate location of the small cell 1710, an approximate range between the satellite 1750 and the small cell 1710, approximate time information, and/or timing bias information (i.e. clock bias information) associated with the satellite 1750.

After the small cell 1710 has received the aiding information, at least one processor in the small cell 1710 determines the precise absolute time (to within several microseconds of accuracy) by using the timing phase of the code of the signal(s) 1740 and the aiding information. After the processor(s) determines the precise absolute time, at least one processor in the small cell 1710 aligns system correlators of the small cell 1710 using the precise absolute time to facilitate positioning of the small cell 1710. After the processor(s) aligns the system correlators of the small cell 1710, at least one processor in the small cell 1710 measures ranging code (e.g., an Iridium iGPS ranging code) for the satellite 1750 over time. Once the processor(s) measures the ranging code, at least one processor in the small cell 1710 combines the ranging code with aiding information, such as satellite 1750 orbit information and timing signals, to obtain absolute geolocation of the small cell 1710.

FIG. 8 provides a detailed depiction of a small cell system 1800 that is able to perform in occluded or jammed environments according to an embodiment of the present invention. The system 1800 illustrated in FIG. 8 is similar to the system 1700 depicted in FIG. 7 except that the system 1800 in FIG. 8 shows additional specific details. In FIG. 8, a small cell 1810 is shown to be located inside of a house 1820. The small cell 1810 is connected to a wireless broadband router 1830, which is in wireless communication with a smart phone 1840 and a laptop computer 1850.

In order for the small cell 1810 to be operational, the small cell 1810 must be connected to the mobile service provider's network 1865 and initialized. In this figure, the small cell 1810 is shown to be connected to mobile service provider's network 1865 via the broadband router 1830 by cable, DSL, or fiber through the Internet 1870. After the small cell is connected to the mobile service provider's network 1865, the user of the small cell 1810 must then declare which mobile phone numbers are allowed to connect to the small cell 1810. This is performed by the user using a web interface, which is provided by the mobile service provider, that connects to the mobile service provider's network 1865 via the Internet 1870. For the example depicted in FIG. 8, the phone number of the smart phone 1840 is declared to be allowed to connect to the small cell 1810.

The small cell 1810, which is equipped with an Iridium receiver, is shown to be receiving at least one precision time signal 1855 from a LEO Iridium satellite 1860. The signal(s) 1855 comprise repeatable code, such as pseudorandom code (e.g., an Iridium signal as described above according to one or more embodiments with respect to FIGS. 1-3B). After the small cell 1810 has received the signal(s) 1855, at least one processor in the small cell 1810 determines the timing phase of the code of the signal(s) 1855.

The small cell 1855 receives aiding information from the wireless service provider's network 1865 via the broadband router 1830 by cable, DSL, or fiber through the Internet 1870. The wireless service provider's network 1865 obtains the aiding information from an Iridium server 1875 and/or a network time protocol (NTP) or precision time protocol (PTP) server 1880. The aiding information may include orbit information associated with the satellite 1860, an approximate location of the small cell 1810, an approximate range between the satellite 1860 and the small cell 1810, approximate time information, and/or timing bias information (i.e. clock bias information) associated with the satellite 1860.

Once the small cell 1810 has received the aiding information, at least one processor in the small cell 1810 determines the precise absolute time by using the timing phase of the code of the signal(s) 1855 and the aiding information. After the processor(s) determines the precise absolute time, at least one processor in the small cell 1810 aligns system correlators of the small cell 1810 using the precise absolute time to facilitate positioning of the small cell 1810. Once the processor(s) aligns the system correlators of the small cell 1810, at least one processor in the small cell 1810 measures ranging code for the satellite 1860 over time. After the processor(s) measures the ranging code, at least one processor in the small cell 1810 combines the ranging code with the aiding information (e.g., satellite 1860 orbit information and timing signals) to obtain absolute geolocation of the small cell 1810. Once the precise absolute time and the location of the small cell 1810 are obtained, the small cell 1810 is able to synchronize its timing with the timing of the mobile service provider network 1865, and the mobile service provider network 1865 is able to coordinate the small cell's 1810 mobile data traffic with the mobile data traffic of nearby cell towers 1885 and/or other small cells.

After the small cell is connected to the mobile service provider's network 1865 and initialized (i.e. the mobile phone numbers are declared, the small cell 1810 synchronized its time, and the small cell obtained its location), the small cell 1810 is operational. During operation, the smart phone 1840 is able to be connected (wirelessly) to the small cell 1810. The small cell 1810 then relays the call information from the smart phone 1840 to the mobile service provider's network 1865 via the broadband router 1830 by cable, DSL, or fiber through the Internet 1870.

FIG. 9 provides a flow diagram of a method 1900 for operation of a small cell system that is able to perform in occluded or jammed environments according to an embodiment of the present invention. The flow diagram of FIG. 9 may be implemented for use with the small cell system 1700, 1800 of FIG. 7 and/or FIG. 8.

At the start 1910 of the method 1900, at least one antenna associated with the small cell receives at least one precision time signal from at least one satellite 1920. The precision time signal(s) comprises a correlation code. Then, at least one processor determines a timing phase of the code 1930. After the timing phase of the code is determined, at least one processor determines the precise absolute time by using the timing phase and the aiding information 1950. At least one processor then aligns system correlators of the small cell using the precise absolute time to facilitate positioning of the small cell 1960. Once the system correlators are aligned, at least one processor measures ranging code from at least one satellite over time 1970. After the ranging code is measured, at least one processor combines the ranging code with the aiding information to obtain absolute geolocation of the small cell 1980. Once the absolute geolocation of the small cell is obtained, the method 1900 ends 1990.

FIG. 10A provides a depiction of a conventional macro-cell system 4000 that requires an external antenna 4010 to perform. A macrocell is a cell in a mobile phone network that provides radio coverage served by a high power cellular base station (i.e. a cell tower) 4010. Generally, macrocells have a coverage area that is larger than the coverage area of a small cell. The antennas 4010 for macrocells are mounted on ground-based masts, rooftops, and other existing structures, at a height that provides a clear view over the surrounding buildings and terrain in order to receive GPS signals, which are used for time synchronization. In this figure, a mobile service provider building 4020 is shown. The mobile service provider building 4020 contains equipment that is used to operate the macro-cell system 4000. Also in this figure, the mobile service provider building 4020 is shown to have a communication cable 4030 running from itself 4020 to a nearby cell tower 4010. The cell tower 4010 must be located outside of the mobile service provider building 4020 in an unobstructed location in order to receive the GPS signals that are necessary for time synchronization. In this more typical arrangement, costs are often incurred by running cables and renting space for the mounted antennas.

FIG. 10B provides an illustration of a macro-cell system 4040 that is able to perform in occluded or jammed environments according to an embodiment of the present invention. In this figure, a macrocell 4050 is shown to be located in an attenuated environment inside a mobile service provider building 4060, which contains equipment that is used to operate the macro-cell system 4040. This new arrangement should reduce costs associated with the cables and space rental as noted in the description of FIG. 10A. The macrocell 4050 is equipped with an Iridium receiver, and is shown to be receiving at least one precision time signal 4070 from a LEO Iridium satellite 4080. The signal(s) 4070 are in the form of repeatable code (i.e. a correlation code), such as pseudorandom code (e.g., an Iridium signal as described above according to one or more embodiments with respect to FIGS. 1-3B). Once the macrocell 4050 has received the signal(s) 4070, at least one processor in the macrocell 4050 determines the timing phase of the code of the signal(s) 4070.

The macrocell 4050 receives aiding information, either wirelessly and/or by wire. The aiding information may include orbit information associated with the satellite 4080, an approximate location of the macrocell 4050, an approximate range between the satellite 4080 and the macrocell 4050, approximate time information, and/or timing bias information (i.e. clock bias information) associated with the satellite 4080.

Once the macrocell 4050 has received the aiding information, at least one processor in the macrocell 4050 determines the precise absolute time (to within several microseconds of accuracy) by using the timing phase of the code of the signal(s) 4070 and the aiding information.

In some embodiments, after the processor(s) determines the precise absolute time, at least one processor in the macrocell 4050 aligns system correlators of the macrocell 4050 using the precise absolute time to facilitate positioning of the macrocell 4050. After the processor(s) aligns the system correlators of the macrocell 4050, at least one processor in the macrocell 4050 measures ranging code (e.g., an Iridium iGPS ranging code) for the satellite 4080 over time. Once the processor(s) measures the ranging code, at least one processor in the macrocell 4050 combines the ranging code with aiding information, such as satellite 4080 orbit information and timing signals, to obtain absolute geolocation of the macrocell 4050.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, may be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

We claim:

1. A method for a cell to obtain precise absolute time from a satellite, the method comprising:
   receiving, with at least one antenna associated with the cell, at least one precision time signal from at least one satellite,
   wherein the at least one precision time signal comprises a series of messages, wherein each of the messages comprises a correlation code;
   determining, with at least one processor, a timing phase of the code based on an identified message that generated a highest correlation peak from the series of messages;
   receiving, by the at least one processor, aiding information; and
   determining, by the at least one processor, the precise absolute time by using the timing phase and the aiding information.

2. The method of claim 1, wherein the cell is one of a small cell and a macro cell.

3. The method of claim 1, wherein the aiding information is received by the at least one processor through a network.

4. The method of claim 3, wherein the network is provided by ground based infrastructure.

5. The method of claim 3, wherein the network is at least one of a cellular network, a WiFi network, and an Internet network.

6. The method of claim 1, wherein the aiding information comprises at least one of orbit information associated with at least one of the at least one satellite, an approximate location of the cell, an approximate range between at least one of the at least one satellite and the cell, approximate time information, and timing bias information associated with at least one of the at least one satellite.

7. The method of claim 1, wherein the code alternates between a coarse timing code and a pseudorandom code.

8. The method of claim 1, wherein the at least one satellite is at least one of a Low Earth Orbiting (LEO) satellite, a Medium Earth Orbiting (MEO) satellite, and a Geosynchronous Earth Orbiting (GEO) satellite.

9. The method of claim 8, wherein the LEO satellite is one of an Iridium satellite and a Globalstar satellite.

10. The method of claim 8, wherein the MEO satellite is one of a BeiDou COMPASS satellite, a Galileo satellite, and a Global Orbiting Navigation System (GLONASS) satellite.

11. The method of claim 1, wherein the method further comprises determining the aiding information from a Doppler profile of at least one of the at least one satellite.

12. A system for a cell to obtain precise absolute time from a satellite, the system comprising:
    the cell;
    at least one antenna associated with the cell to receive at least one precision time signal from at least one satellite,
    wherein the at least one precision time signal comprises a series of messages, wherein each of the messages comprises a correlation code; and
    at least one processor configured to determine a timing phase of the code based on an identified message that generated a highest correlation peak from the series of messages, to receive aiding information, and to determine the precise absolute time by using the timing phase and the aiding information.

13. The system of claim 12, wherein the cell is one of a small cell and a macro cell.

14. The system of claim 12, wherein the aiding information is received by the at least one processor through a network.

15. The system of claim 14, wherein the network is provided by ground based infrastructure.

16. The system of claim 14, wherein the network is at least one of a cellular network, a WiFi network, and an Internet network.

17. The system of claim 12, wherein the aiding information comprises at least one of orbit information associated with at least one of the at least one satellite, an approximate location of the cell, an approximate range between at least one of the at least one satellite and the cell, approximate time information, and timing bias information associated with at least one of the at least one satellite.

18. The system of claim 12, wherein the code alternates between a coarse timing code and a pseudorandom code.

19. The system of claim 12, wherein the at least one satellite is at least one of a Low Earth Orbiting (LEO) satellite, a Medium Earth Orbiting (MEO) satellite, and a Geosynchronous Earth Orbiting (GEO) satellite.

20. The system of claim 19, wherein the LEO satellite is one of an Iridium satellite and a Globalstar satellite.

21. The system of claim 19, wherein the MEO satellite is one of a BeiDou COMPASS satellite, a Galileo satellite, and a Global Orbiting Navigation System (GLONASS) satellite.

22. The system of claim 12, wherein the at least one processor is further configured to determine the aiding information from a Doppler profile of at least one of the at least one satellite.

* * * * *